US012657514B2

(12) United States Patent
Imig et al.

(10) Patent No.: US 12,657,514 B2
(45) Date of Patent: Jun. 16, 2026

(54) SYSTEMS AND METHODS FOR AI INFERENCE PLATFORM AND SENSOR CORRELATION

(71) Applicant: Palantir Technologies Inc., Denver, CO (US)

(72) Inventors: Robert Imig, Washington, DC (US); Steven Fackler, Arlington, VA (US); Ian Peters, Littleton, CO (US); Mark Elliot, New York, NY (US); Joseph Ellis, Denver, CO (US); Andres Felipe Orozco, New York, NY (US); Akash Jain, Oakland, CA (US)

(73) Assignee: Palantir Technologies Inc., Aventura, FL (US)

( * ) Notice: Subject to any disclaimer, the term of this patent is extended or adjusted under 35 U.S.C. 154(b) by 731 days.

(21) Appl. No.: 18/082,123

(22) Filed: Dec. 15, 2022

(65) Prior Publication Data

US 2023/0196201 A1      Jun. 22, 2023

Related U.S. Application Data

(60) Provisional application No. 63/290,947, filed on Dec. 17, 2021.

(51) Int. Cl.
*G06N 20/00* (2019.01)
(52) U.S. Cl.
CPC .................................... *G06N 20/00* (2019.01)
(58) Field of Classification Search
CPC .................................................... G06N 20/00
See application file for complete search history.

(56) References Cited

U.S. PATENT DOCUMENTS

| | | | | |
|---|---|---|---|---|
| 10,387,794 B2 * | 8/2019 | Okanohara | ............ | G06N 20/00 |
| 11,257,002 B2 * | 2/2022 | Faulhaber, Jr. | .......... | G06N 3/08 |

(Continued)

FOREIGN PATENT DOCUMENTS

| | | |
|---|---|---|
| CH | 718896 A2 | 2/2023 |
| CH | 719269 A2 | 6/2023 |

(Continued)

OTHER PUBLICATIONS

International Search Report and Written Opinion for International patent application No. PCT/US2022/052991, filed Dec. 15, 2022, mailed Apr. 12, 2023.

(Continued)

*Primary Examiner* — David E Choi
(74) *Attorney, Agent, or Firm* — Faegre Drinker Biddle & Reath LLP

(57) ABSTRACT

System and method for model orchestration and sensor correlation according to certain embodiments. For example, a method includes: accessing a plurality of models, each model of the plurality of models configured to process data; receiving information corresponding to a plurality of sensors associated with a plurality of edge devices; selecting one or more models from the plurality of models based on a processing request; selecting one or more sensors from the plurality of sensors based on the processing request; building one or more model pipelines based at least in part on the one or more selected models and the one or more selected sensors; and deploying the one or more model pipelines.

22 Claims, 16 Drawing Sheets

(56)                References Cited

U.S. PATENT DOCUMENTS

| | | | | |
|---|---|---|---|---|
| 11,373,119 | B1 * | 6/2022 | Doshi | G06N 3/08 |
| 11,677,634 | B1 * | 6/2023 | Nookula | H04L 41/0816 |
| | | | | 370/254 |
| 12,293,260 | B2 * | 5/2025 | Kuo | G06N 5/04 |
| 12,307,294 | B2 * | 5/2025 | Marche | G06N 3/045 |
| 12,367,392 | B1 * | 7/2025 | Ghosh | G06N 3/08 |
| 12,387,132 | B1 * | 8/2025 | Tong | G06F 16/9024 |
| 2019/0036716 | A1 * | 1/2019 | Kasaragod | H04L 63/104 |
| 2019/0163667 | A1 * | 5/2019 | Feuz | G06F 9/547 |
| 2020/0210538 | A1 * | 7/2020 | Wang | F03D 17/00 |
| 2021/0271802 | A1 * | 9/2021 | Kramer | G06N 3/08 |
| 2021/0360070 | A1 * | 11/2021 | Cella | H04W 40/02 |
| 2021/0409520 | A1 * | 12/2021 | Torres | H04L 41/0803 |
| 2022/0092112 | A1 * | 3/2022 | Martin | G06T 11/206 |
| 2022/0150125 | A1 * | 5/2022 | Kumar | G06N 20/00 |
| 2022/0261631 | A1 * | 8/2022 | Cohen | G06N 20/00 |
| 2022/0277231 | A1 * | 9/2022 | Ostergaard | G06N 20/20 |
| 2023/0036702 | A1 * | 2/2023 | Reisser | G06N 3/02 |
| 2023/0048481 | A1 * | 2/2023 | Elder | G06N 3/045 |
| 2023/0050870 | A1 * | 2/2023 | Elder | H04L 41/16 |
| 2023/0104246 | A1 * | 4/2023 | Jeyapaul | G06F 1/3234 |
| | | | | 713/320 |
| 2023/0196201 | A1 * | 6/2023 | Imig | G06N 20/00 |
| | | | | 706/12 |
| 2023/0252278 | A1 * | 8/2023 | Kweider | G06N 3/08 |
| | | | | 706/12 |
| 2023/0385692 | A1 * | 11/2023 | Kang | G06N 20/00 |
| 2023/0394334 | A1 * | 12/2023 | Kang | H04W 4/38 |
| 2023/0394335 | A1 * | 12/2023 | Cross | G06V 10/52 |
| 2024/0169269 | A1 * | 5/2024 | Sikka | G06N 3/0464 |
| 2024/0233359 | A1 * | 7/2024 | Kundu | G06V 10/82 |
| 2024/0244454 | A1 * | 7/2024 | Xu | G06N 3/0464 |
| 2024/0320545 | A1 * | 9/2024 | Cohen | G06N 20/00 |
| 2024/0346388 | A1 * | 10/2024 | Wilczynski | G06N 20/20 |
| 2024/0394573 | A1 * | 11/2024 | Julian | G06V 30/2504 |
| 2025/0103962 | A1 * | 3/2025 | Turley | G06N 5/02 |

FOREIGN PATENT DOCUMENTS

| | | | |
|---|---|---|---|
| EP | 3399666 | A1 | 11/2018 |
| WO | 2017074966 | A1 | 5/2017 |
| WO | 2023/018815 | A1 | 2/2023 |
| WO | 2023/114386 | A1 | 6/2023 |

OTHER PUBLICATIONS

Nathan Strout: "Inside the Army's Futuristic Test of its Battlefield Artificial Intelligence in the Desert," Sep. 25, 2020, XP093035348, Retrieved from the Internet: <https://www.c4isrnet.com/artificial-intelligence/2020/09/25/the-army-just-conducted-a-massive-test-of-its-battlefield-artificial-intelligence-in-the-desert/> [retrieved on Mar. 28, 2023] pp. 1, 2, 4.

Osman, "A novel big data analytics framework for smart cities," Future Generation Computer Systems, Jul. 17, 2018, vol. 91, pp. 620-633.

Tsiatsis et al., "Real-Time lot Stream Processing and Large-scale Data Analytics for Smart City Applications," City Pulse Collaborative Project, Smart City Framework, Grant Agreement No. 609035, FP7-Smartcities-2013, Feb. 11, 2016, pp. 1-50.

* cited by examiner

400

410

420

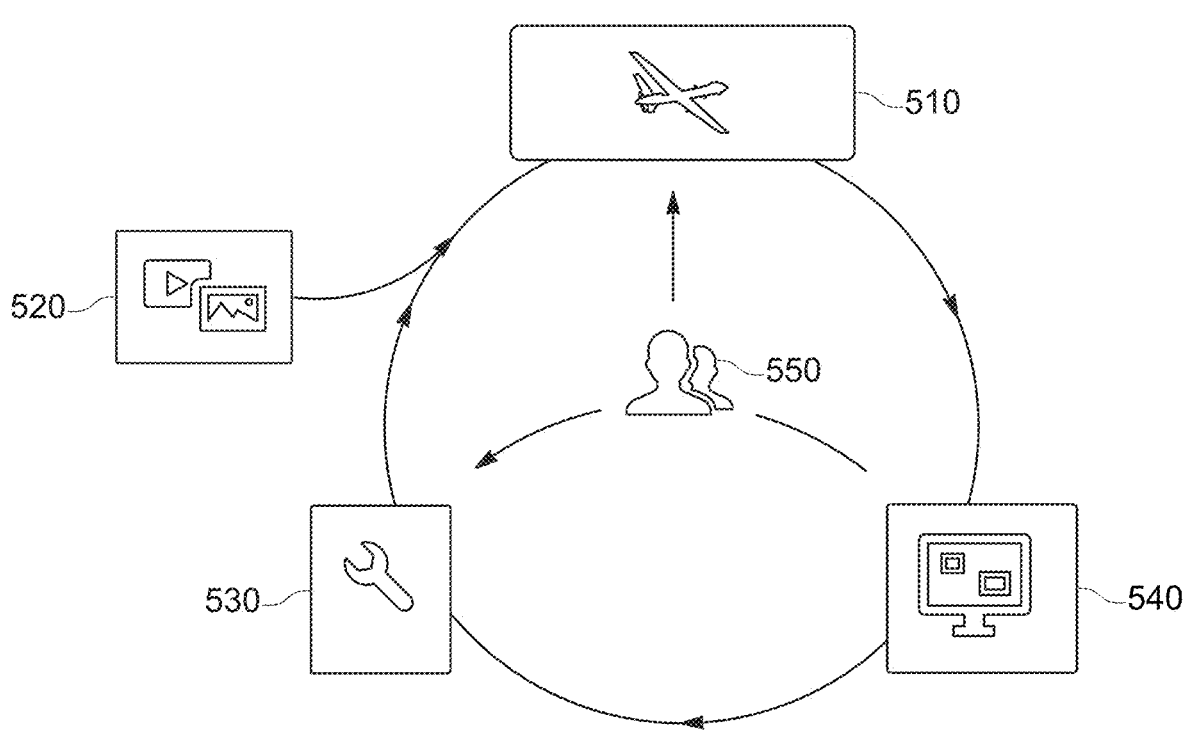
FIG. 5

600

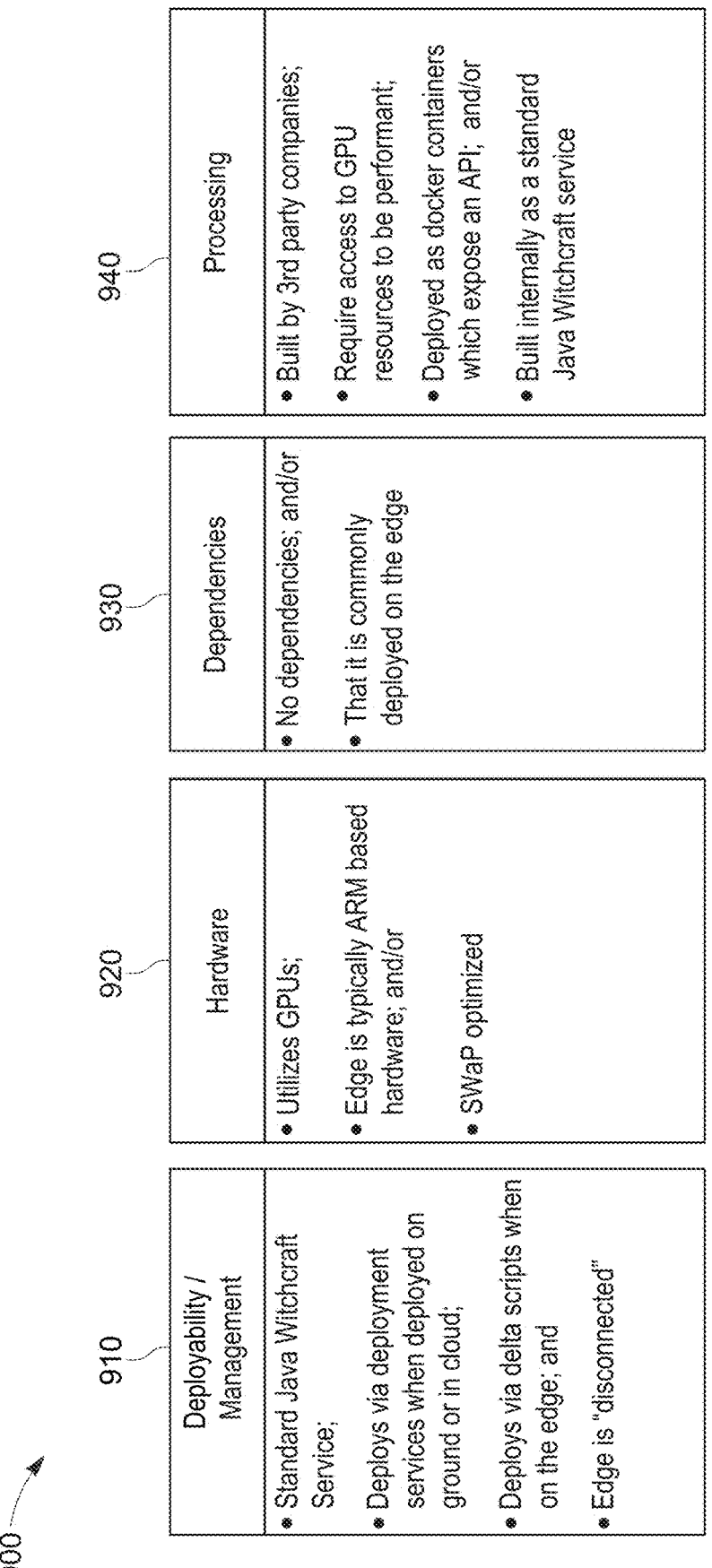

Deployability /
Management

- Standard Java Witchcraft
  Service;

- Deploys via deployment
  services when deployed on
  ground or in cloud;

- Deploys via delta scripts when
  on the edge; and

- Edge is "disconnected"

920

Hardware

- Utilizes GPUs;

- Edge is typically ARM based
  hardware; and/or

- SWaP optimized

930

Dependencies

- No dependencies; and/or

- That it is commonly
  deployed on the edge

940

Processing

- Built by 3rd party companies;

- Require access to GPU
  resources to be performant;

- Deployed as docker containers
  which expose an API; and/or

- Built internally as a standard
  Java Witchcraft service

1000

According to Some Embodiments,
AIP is integrated to one or more
AIP compatible processors

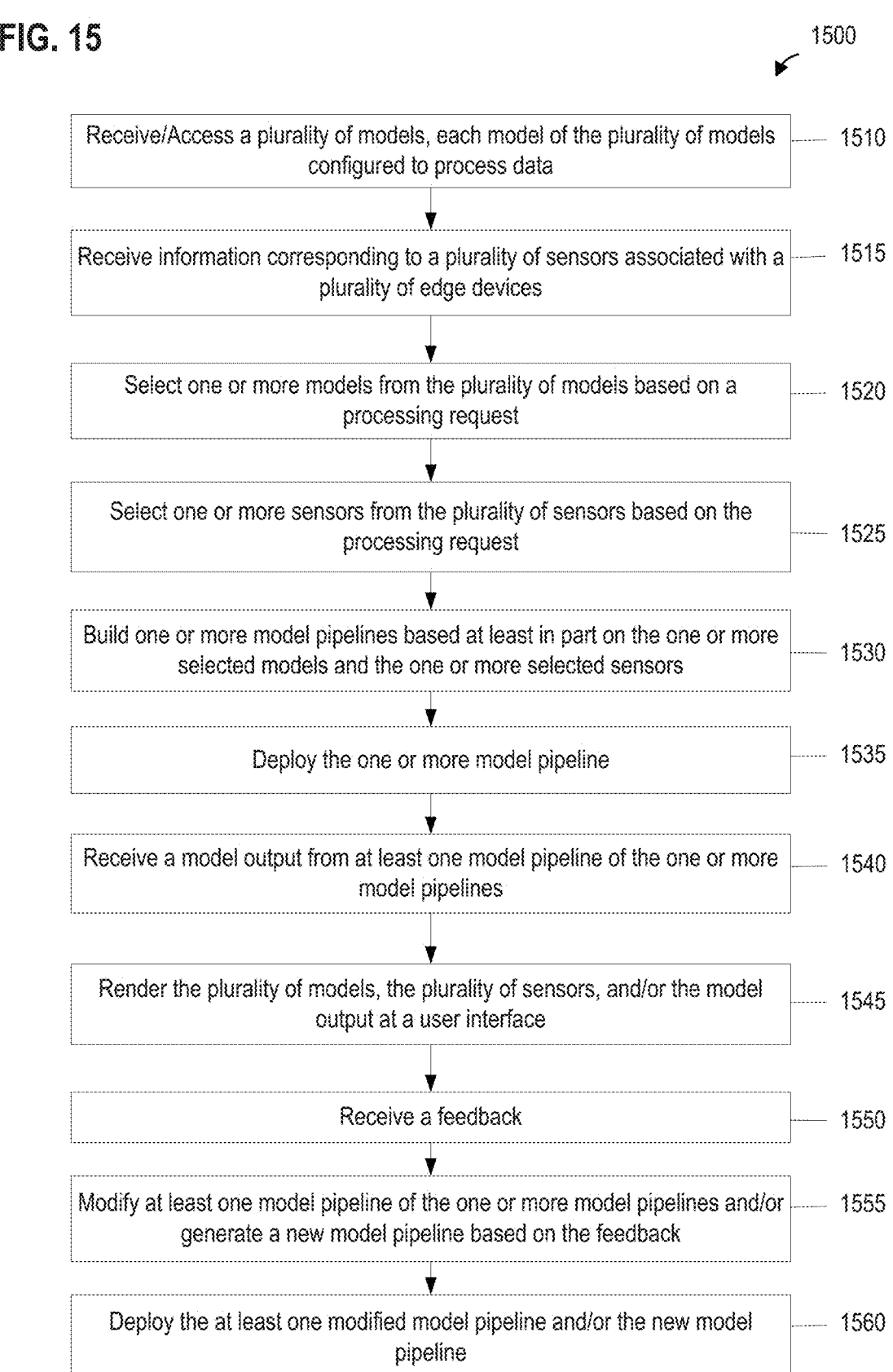

1500

Receive/Access a plurality of models, each model of the plurality of models configured to process data — 1510

Receive information corresponding to a plurality of sensors associated with a plurality of edge devices — 1515

Select one or more models from the plurality of models based on a processing request — 1520

Select one or more sensors from the plurality of sensors based on the processing request — 1525

Build one or more model pipelines based at least in part on the one or more selected models and the one or more selected sensors — 1530

Deploy the one or more model pipeline — 1535

Receive a model output from at least one model pipeline of the one or more model pipelines — 1540

Render the plurality of models, the plurality of sensors, and/or the model output at a user interface — 1545

Receive a feedback — 1550

Modify at least one model pipeline of the one or more model pipelines and/or generate a new model pipeline based on the feedback — 1555

Deploy the at least one modified model pipeline and/or the new model pipeline — 1560

SYSTEMS AND METHODS FOR AI INFERENCE PLATFORM AND SENSOR CORRELATION

CROSS REFERENCE TO RELATED APPLICATIONS

This application claims priority to U.S. Provisional Application No. 63/290,947, filed Dec. 17, 2021, incorporated by reference herein for all purposes.

TECHNICAL FIELD

Certain embodiments of the present disclosure are directed to systems and methods for model orchestration and sensor correlation. More particularly, some embodiments of the present disclosure provide systems and methods for orchestrating artificial intelligence (AI) models and other computational models and providing sensor correlation.

BACKGROUND

Artificial intelligence ("AI") is widely used in analyzing data to facilitate object detection, prediction, decision making, and other uses. For example, AI inference is a process of using AI models to make a prediction. AI inference often needs a large number of computing resources and memory resources.

Edge devices (e.g., devices with sensing and/or computing capability) can be deployed to dispersed locations on earth or in space. Some edge devices may include one or more sensors for collecting sensor data and/or one or more computing resources to process data (e.g., identifying objects). A satellite can include and/or integrate with edge devices. As an example, edge devices can be deployed to various areas to complete certain tasks.

Hence it is desirable to improve the techniques for AI inference and sensor correlation.

SUMMARY

Certain embodiments of the present disclosure are directed to systems and methods for model orchestration and sensor correlation. More particularly, some embodiments of the present disclosure provide systems and methods for using artificial intelligence models and other computational models in model orchestration and sensor correlation.

According to some embodiments, a method for model and sensor orchestration, the method comprising: accessing a plurality of models, each model of the plurality of models configured to process data; receiving information corresponding to a plurality of sensors associated with a plurality of edge devices; selecting one or more models from the plurality of models based on a processing request; selecting one or more sensors from the plurality of sensors based on the processing request; building one or more model pipelines based at least in part on the one or more selected models and the one or more selected sensors, each model pipeline of the one or more model pipelines including information associated with at least one selected model of the one or more selected models or at least one selected sensor of the one or more selected sensors; and deploying the one or more model pipelines to at least one of the plurality of edge devices; wherein the method is performed using one or more processors.

According to certain embodiments, system for model and sensor orchestration, the system comprising: one or more memories comprising instructions stored thereon; and one or more processors configured to execute the instructions and perform operations comprising: accessing a plurality of models, each model of the plurality of models configured to process data; receiving information corresponding to a plurality of sensors associated with a plurality of edge devices; selecting one or more models from the plurality of models based on a processing request; selecting one or more sensors from the plurality of sensors based on the processing request; building one or more model pipelines based at least in part on the one or more selected models and the one or more selected sensors, each model pipeline of the one or more model pipelines including information associated with at least one selected model of the one or more selected models or at least one selected sensor of the one or more selected sensors; and deploying the one or more model pipelines.

BRIEF DESCRIPTION OF THE DRAWINGS

FIG. 5 is an illustrative AIP system according to certain embodiments of the present disclosure.

FIG. 9 is an illustrative example of features of an AIP system according to certain embodiments of the present disclosure.

FIG. 10 is an illustrative diagram of an AIP system according to certain embodiments of the present disclosure.

FIG. 15 is a simplified diagram showing a method for model orchestration and sensor correlation according to certain embodiments of the present disclosure.

DETAILED DESCRIPTION

Figure 1:
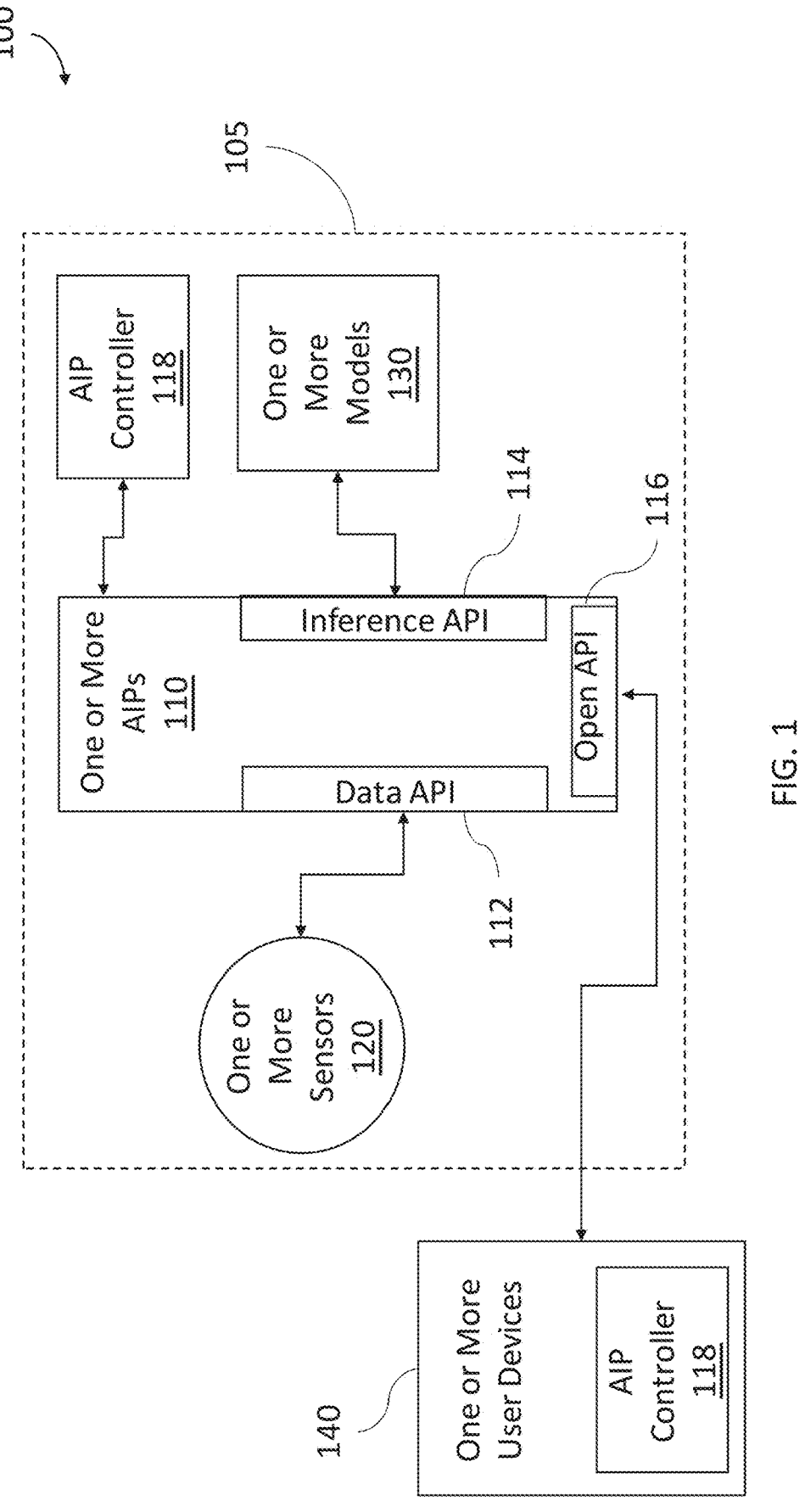
FIG. 1 illustrates one or more model orchestrators in a deployment environment according to some embodiments of the present disclosure.

Unless otherwise indicated, all numbers expressing feature sizes, amounts, and physical properties used in the specification and claims are to be understood as being modified in all instances by the term "about" according to some embodiments. Accordingly, for example, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any number within that range.

Although illustrative methods may be represented by one or more drawings (e.g., flow diagrams, communication flows, etc.), the drawings should not be interpreted as implying any requirement of, or particular order among or between, various steps disclosed herein according to certain embodiments. However, some embodiments may require certain steps and/or certain orders between certain steps, as may be explicitly described herein and/or as may be understood from the nature of the steps themselves (e.g., the performance of some steps may depend on the outcome of a previous step). Additionally, for example, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input according to some embodiments. As an example, predicting an outcome based on a particular piece of information may additionally, or alternatively, base the same determination on another piece of information. As used herein, for example, the term "receive" or "receiving" means obtaining from a data repository (e.g., database), from another system or service, from another software, or from another software component in a same software. In certain embodiments, the term "access" or "accessing" means retrieving data or information, and/or generating data or information.

According to certain embodiments, AI inference platform (AIP) orchestrates between the input sensor data and output feeds. As an example, AIP is a model orchestrator for one or more models and/or one or more sensors (e.g., sensor feeds). In some embodiments, a model, or referred to as a computing model or as an algorithm, includes a model to process data. A model includes, for example, an AI model, a machine learning (ML) model, a deep learning (DL) model, an image processing model, a physics model, simple heuristics, rules, a math model, other computing models, and/or a combination thereof. For example, one or more components of AIP are utilizing open standard formats (e.g., input data format, output data format). As an example, AIP takes care of the decoding of the input data, orchestration between processors and artificial intelligence (AI) models, and then packages up the results into an open output format for downstream consumers. According to some embodiments, an AIP system includes one or more AIPs to orchestrate one or more sensors, one or more edge devices, one or more user devices, and/or one or more models. In certain embodiments, at least some of the one or more sensors, one or more edge devices, one or more user devices, and one or more models are each associated with an AIP.

According to some embodiments, one or more AIPs, one or more sensors, and one or more models are disposed in an edge device. For example, the edge device is a computing device disposed on or integrated with a satellite, and the sensor is an orbiting sensor. As an example, an edge device is a computing device disposed on or integrated with an aircraft, a submarine, and/or a vehicle. As an example, an edge device includes one or more sensors in the air, in the space, under the sea, in the water, on the land, and/or at other locations. In certain examples, an edge device is a physical device including one or more sensors, one or more AIPs, and/or one or more model(s).

In some embodiments, the model is configured to generate an insight based on the processed sensor data. In certain embodiments, one or more models can be implemented on one or more processors (e.g., one or more central processing units (CPUs), one or more graphics processing units (GPUs), one or more digital signal processors (DSPs), one or more microprocessors, one or more processors, etc.) utilizing certain respective computing resources, where a model can also be referred to as a model processor (e.g., a verification processor, a geo-registration processor, etc.). As user herein, an insight refers to an output of a computing model. In certain examples, the AIP is configured to transmit collected sensor data, processed sensor data, and/or the insight to a user device (e.g., a server, a base station, a center station, a center node, a computing device at a mothership, etc.), for example, via an application programing interface (API). In some embodiments, an API is a software interface including, for example, an application programming interface (API), a web service interface, retrieving information from a file, retrieving information from a data repository, and/or the like.

FIG. 1 illustrates one or more model orchestrators (e.g., AIPs) 110 in a deployment environment 100 according to some embodiments of the present disclosure. FIG. 1 is merely an example. One of ordinary skill in the art would recognize many variations, alternatives, and modifications. According to certain embodiments, the deployment environment 100 includes one or more edge devices 105 and one or more user devices 140 (e.g., a computing device associated with a user, a computing device at a base station, a base device, etc.). The one or more edge devices 105 include one or more AIPs 110, one or more AIP controllers (e.g., an orchestration controller) 118, one or more sensors 120, and/or one or more models 130. In some examples, the one or more AIPs 110 include a data API 112, an inference API 114, and/or an open API 116. Although the above has been shown using a selected group of components for the AIP 110, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain examples, the data API 112 is configured to interface with the one or more sensors 120. In some examples, the data API 112 includes a specific data format (e.g., a predefined data format) or data stream format (e.g., a predefined data packet format) for a type of sensor. As an example, the data API 112 includes a first data format for a first sensor type (e.g., an image sensor) and a second data format for a second sensor type (e.g., a motion sensor), where the first data format is different from the second data format. For example, the data API 112 is configured to receive various sensor feeds. As an example, the data API 112 is configured to receive a sensor feed with data format information.

In certain examples, the AIP 110 is configured to receive sensor data via the data API 112. In some examples, the AIP 110 is configured to process the received sensor data received from the data API 112. In certain examples, the AIP 110 includes one or more models, computing units, and/or storage units. For example, the AIP 110 is configured to decode the sensor data. As an example, the AIP 110 is configured to extract a single frame from video data. In one example, the AIP 110 is configured to decode the extracted single frame. For example, the AIP 110 includes one or more AI models to recognize objects or patterns in the sensor data. As an example, the AIP 110 is configured to combine data.

In some examples, the inference API 114 is configured to be coupled to the one or more models 130. In certain examples, the inference API 114 includes a predetermined interface to couple to the one or more models 130. In some examples, the inference API 114 includes a dynamically configurable interface to couple to the one or more models 130. In some embodiments, the interface specification is predetermined but the system can dynamically add and/or remove models and/or processors that conform to that specification at runtime.

In certain examples, the inference API 114 is configured to couple to the one or more models 130 based upon a configuration (e.g., a system configuration, a user configuration) and/or an input (e.g., a user input, an input received via a software interface). In some examples, the inference API 114 is configured to couple to the one or more models 130 automatically or dynamically based on the processed sensor data. In certain examples, the AIP 110 is configured to transmit processed sensor data to the one or more models 130 via the inference API 114.

According to some embodiments, the AIP 110 is configured to change the one or more models 130 coupled via the inference API 114 dynamically. In certain examples, the AIP 110 is configured to change the one or more models 130 based upon a configuration (e.g., a system configuration, a user configuration) and/or an input (e.g., a user input, an input received via a software interface). In some examples, the AIP 110 is configured to change the one or more models 130 automatically or dynamically based on the processed sensor data. As an example, the AIP 110 is configured to change the one or more models 130 in response to changes to the sensor data collected via the one or more sensors 120. In certain examples, the AIP 110 is configured to change the one or more models 130 without affecting the connection to the one or more sensors 120. In some examples, the AIP 110 is configured to upgrade the one or more models 130 without affecting the connection to the one or more sensors 120. In certain examples, the AIP 110 is configured to replace the one or more models 130 with a new model without affecting the connection to the one or more sensors 120. In some examples, the one or more models 130 is changed, upgraded, and/or replaced by a push operation in the deployment environment 100.

According to certain embodiments, the AIP 110 is configured to change the one or more sensors 120 coupled via the data API 112 dynamically. In certain examples, the AIP 110 is configured to change the one or more sensors 120 based upon a configuration (e.g., a system configuration, a user configuration) and/or an input (e.g., a user input, an input received via a software interface). In some examples, the AIP 110 is configured to change the one or more sensors 120 or add a coupled sensor automatically or dynamically, for example, based on a command received via a software interface.

According to some embodiments, the AIP controller 118 can be used to configure, control, and/or manage the one or more AIPs 110, including managing components to be coupled to the one or more AIPs 110. In certain examples, the AIP controller 118 is configured to send a request to the AIP 110 to make changes to the one or more sensors 120 and/or make changes to the one or more models 130. In certain embodiments, at least one of the one or more user devices 140 includes an AIP controller 118. In some embodiments, at least one of the one or more edge devices 105 includes an AIP controller 118. In some examples, the AIP controller 118 includes a user interface (e.g., a graphical user interface). In certain examples, the AIP controller 118 allows a user to select one or more models (e.g., algorithms) to be added to one or more models 130. In some examples, the AIP controller 118 allows a user to select one or more models (e.g., algorithms) to be updated to one or more models 130. In certain examples, the AIP controller 118 allows a user to select to deploy a new or updated model 130 to the AIP 110.

In some embodiments, the AIP controller 118 allows a user to configure a model pipeline (e.g., order, schedule, latency, etc.), also referred to as a processing pipeline, for using one or more models, one or more processors, and/or one or more edge devices. In certain embodiments, a processing pipeline includes a plurality of computing models running sequentially or in parallel. For example, a processing pipeline includes a first and second computing model, where an output of the first computing model (e.g., an upstream model) is provided as an input of the second computing model (e.g., a downstream model). As an example, the processing pipeline includes the first computing model and a third computing model running in parallel. In some embodiments, the AIP controller 118 is configured to use a message (e.g., a low bandwidth message) to the AIP 110. In certain examples, in response to receiving the message, the AIP 110 updates the one or more models for deployment, for example, by loading the one or more models for a same hosting device or a local device (e.g., a computing device close by, a computing device connected by wire).

According to certain embodiments, the AIP 110, the one or more sensors 120, and the one or more models 130 are disposed in an edge device 105. In some examples, the one or more models 130 is configured to generate an insight (e.g., a model output) based on the processed sensor data. In certain examples, the open API 116 is configured to couple to the user device 140. In some examples, the AIP 110 is configured to transmit collected sensor data, processed sensor data, and/or the insight to the user device 140. In certain examples, the open API 116 is configured to broadcast to a network.

As discussed above and further emphasized here, FIG. 1 is merely an example. One of ordinary skill in the art would recognize many variations, alternatives, and modifications. For example, a sensor 120 is replaced by a sub-system that includes one or more components that are not sensors. As an example, a one or more models 130 is a micro-model.

Figure 2:
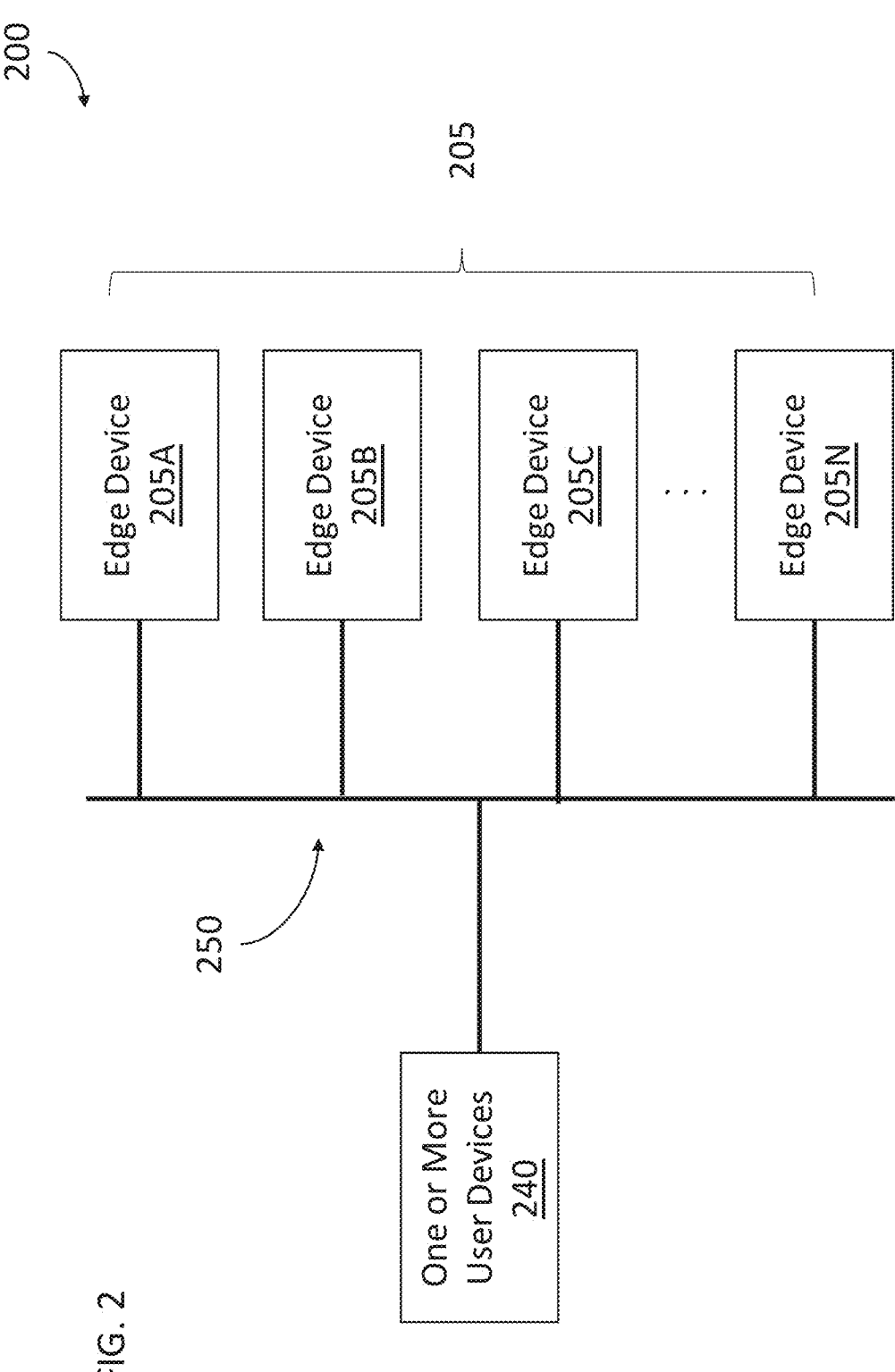
FIG. 2 illustrates a model orchestration and sensor correlation system according to some embodiments of the present disclosure.

FIG. 2 illustrates a model orchestration and sensor correlation system (e.g., an AIP system) 200 according to some embodiments of the present disclosure. FIG. 2 is merely an example. One of ordinary skill in the art would recognize many variations, alternatives, and modifications. According to certain embodiments, the AIP system 200 includes one or more edge devices 205 and one or more user devices 240. Although the above has been shown using a selected group of components for the AIP system 200, there can be many alternatives, modifications, and variations. For example, some of the components may be expanded and/or combined. Other components may be inserted to those noted above.

Depending upon the embodiment, the arrangement of components may be interchanged with others replaced. Further details of these components are found throughout the present specification.

According to some embodiments, the one or more edge devices 205 include an edge device 205A, an edge device 205B, an edge device 205C, . . . and an edge device 205N. For example, an edge device 205 may include an AIP, one or more sensors, one or more models, and/or an AIP controller. Each of the one or more edge devices 205 (e.g., 205A, 205B, 205C, . . . , 205N) may use one or more embodiments of the one or more edge devices 105 described associated with FIG. 1. Each of the one or more user devices 240 may use one or more embodiments of the one or more user devices 140 described associated with FIG. 1. As an example, a user device 240 may include an AIP controller.

According to certain embodiments, the AIP system 200 uses one or more networks 250 for communications among the one or more edge devices 205 and the one or more user devices 240. In some examples, the one or more networks 250 include a broadcast network.

According to some embodiments, the AIP (e.g., the model orchestrator) can interface with one or more applications (e.g., commercial applications and/or solutions, government applications and/or solutions), for example, one or more computer vision algorithms. In certain embodiments, the AIP can generate outputs from one or more different data processing models (e.g., algorithms) that can be displayed by a video player (e.g., a full motion video (FMV) player, a real-time video player). In certain embodiments, the AIP controller has a control and/or configuration interface including one or more sections. In one example, the AIP controller includes a training section (e.g., a left section, a training environment) for the one or more interfaced algorithms. In some embodiments, the training section of the AIP controller allow configurations of data used to train one or more AI algorithms. In certain embodiments, the data is generated from one or more sensors, for example, the sensors interfaced with the AIP. In some embodiments, when the one or more algorithms, or referred to as models, are trained and ready for use, the one or more algorithms (e.g., one or more models) can be deployed (e.g., shipped) to the AIP.

According to certain embodiments, the AIP controller (e.g., the orchestration controller) includes an interface allowing (e.g., configuring) sensor data (e.g., sensor data from various sensors, sensor data from around the world) to feed into the AIP (e.g., the AIP cloud platform). In some embodiments, the AIP and/or the AIP controller can be used to build one or more models and/or algorithms. In certain embodiments, a third party can log into the data management platform and/or solution, for example to grab certain data (e.g., data needed). In some embodiments, a user can interface with the AIP and/or the AIP controller to facilitate building the one or more models and/or algorithms. In certain embodiments, when the one or more models and/or algorithms are ready and/or approved (e.g., approved by an organization, approved by a government organization, approved by an authoritative official), the user can interface the AIP and/or the AIP controller (e.g., by hitting a button) to deploy the one or more models and/or algorithms (e.g., push the one or more models and/or algorithm) to the AIP.

According to some embodiments, the AIP is designed to run in a variety of places at the edge (e.g., approximate to a sensor, at a satellite, at a vehicle, at an airplane, at a hardware device capable of collecting data, etc.). In some embodiments, the AIP can be used with one or more servers and/or processors (e.g., a server capable of running corresponding algorithms, a processor capable of running corresponding algorithms). In certain embodiments, the AIP is a piece of software (e.g., a lightweight piece of software, a very lightweight piece of software) that can be installed in a wide variety of computing devices and/or servers (e.g., a computing device on an aircraft, a computing device on a boat, a computing device on a satellite, a computing device on a ground base vehicle, a computing device on a helicopter, etc.). In some embodiments, the AIP can run in a cloud service and/or a cloud infrastructure. In certain embodiments, the AIP can run on a processor , for example, running on a CPU and utilizing GPU resources. In some examples, the AIP can run one or more processors that are scaled down and scaled up. In some embodiments, the AIP is built in modular fashion where the one or more models and the one or more plug-ins can be incorporated to expand the system and/or solution.

According to certain embodiments, the AIP is a lightweight software allowing the addition of different models with different capabilities and/or allowing the addition of the one or more plug-ins with different one or more processors (e.g., one or processors, one or more modules running on the one or more processors). As used herein, a processor includes one or more models running on the processor. In some embodiments, the AIP can be used to configure the system and/or solution incorporating the AIP (e.g., tailor the system and/or solution for a specific environment, e.g., tailor the system and/or solution for the deployment environment). In certain embodiments, one or more models are built at the AIP controller and get pushed to the AIP. In some embodiments, the AIP is designed to run on various systems and/or devices including one or more selected edge devices (e.g., one or more computing devices close to or integrated with one or more sensors).

In certain embodiments, the AIP is configured to conduct edge AI processing and feed one or more outputs downstream. In some embodiments, the one or more outputs use a standard (e.g., open standard) that can be fed into a wide variety of systems. In some examples, the AIP is configured to interact with one or more data gathering software on one side and one or more data processing applications and/or solutions on another side. In certain examples, the one or more data gathering software and one or more data processing applications and/or solutions are from various entities. In some examples, the AIP is configured to receive continuous feedback from one or more downstream systems, back into the AIP controller (e.g., the training environment). In certain examples, the AIP and/or the AIP controller can build or used to build the next version of one or more models and/or algorithms. In some examples, the next version of one or more models and/or algorithms can be deployed (e.g., shipped) to the AIP, such that the system incorporating the AIP can achieve algorithm development all the way out to the Edge. In certain examples, these features can enable the rapid deployment (e.g., receiving) of these models into an edge real-time environment.

According to some embodiments, a wide variety of inputs (e.g., one or more videos, one or more full motion videos, one or more trimmed videos) can be provided to the AIP and/or the AIP controller. In one example, the inputs could include videos (e.g., CCTV (closed-circuit television) videos) from one or more crowd cameras and/or security cameras. In one example, the input could be imagery (e.g., satellite imagery). In some embodiments, the inputs can include radio frequency (RF) signals, audio signals, and acoustics signals. In certain embodiments, the AIP and/or the AIP controller can receive and/or access one or more sensor outputs (e.g., data fed into the system) and if necessary, decode the one or more sensor outputs. In one example, the AIP and/or the AIP controller is configured to decode the video and decode the various metadata that comes with the video as well. For example, the AIP and/or the AIP controller is configured to receive a video including telemetry data and decode the video into a consumable format. In some embodiments, the AIP and/or the AIP controller can send the decoded data to one or more processors (e.g., processors, models, algorithms, processing software, processing software modules). In certain embodiments, the AIP is configured to receive one or more responses back (e.g., with a specific budget) from the one or more processors and the AIP can orchestrate sending those out.

According to certain embodiments, the AIP can be configured (e.g., via the AIP controller) to interface with one or more selected modules and/or processors, then it can do the orchestration of the pipeline. In one example, the AIP is configured to receive a video input and send the video input to one or more different models (e.g., five models) for processing. In certain examples, the AIP is configured to process the video input using the one or more different models in a specific order. In one example, the AIP is configured to process the video input using two models in parallel. In one example, the AIP is configured to process the video input using three models in serial so that they can actually feed off of each other. In some examples, downstream processors and/or models can utilize upstream results within the processing logic. For example, a cloud detection algorithm runs first on a satellite image, then a ship detection runs next and only runs in places where clouds were not detected, improving efficiency and speed.

According to some embodiments, the AIP can be used in a real time-oriented system. In some examples, each of the one or more processors have a specific budget. For example, the AIP is configured to send a video to a model for processing the video and receive the first processing results in 200 milliseconds. In one example, the AIP can output the first processing results to another model (e.g., geo-registration processor) with a specific budget of 500 milliseconds because it's doing more processing (e.g., more intense processing) in the computer vision process, and after receiving the result, the AIP may send the result out. In one example, the AIP can send the first processing results in parallel to a plurality of models (e.g., AI models, object detection algorithms, etc.), for example, so the plurality of models can benefit from the first processing results (e.g., the upstream processing). In certain embodiments, the AIP includes application programming interface (API) to send one or more inputs to and receive one or more results from one or more processors.

According to certain embodiments, the AIP is configured to format the one or more inputs and the one or more outputs into one or more standard formats (e.g., picture transport streams RT2P, GSP, UDP (user datagram protocol) MPEG-TS (MPEG transport stream), RTP/RTSP (Real-time Transport Protocol/ Real Time Streaming Protocol), off-the-shelf video protocols). In some embodiments, the AIP can encode some of these and do specific metadata streams in the video, into various standard formats (e.g., GeoJSON, Avro, MISB, KLV (key-length-value)). In some embodiments, the AIP includes pipeline logics (e.g., orchestrations, scheduler, management software). In one example, the AIP is implemented as a java service.

According to some embodiments, the AIP is configured to receive one or more raw sensor feeds and push outputs. In certain embodiments, the AIP is configured to execute one or more pipeline logics (e.g., the number of processors and/or models, decoding, encoding, order of processing, parallel processing, etc.).

According to certain embodiments, the AIP is configured to manage and/or orchestrate one or more applications and/or solutions, for example, one or more applications and/or solutions running on one or more servers and/or processors (e.g., across one or more servers). In some embodiments, the AIP includes a scheduler. In certain embodiments, the AIP is performed at the edge (e.g., on an aircraft, on or approximate to a sensor).

According to some embodiments, the AIP controller (e.g., the AIP configuration interface, the orchestration controller) includes at least two sections (e.g., two panels). In one example, one section (e.g., left panel, right panel) includes one or more processors (e.g., one or more models executed on one or more processors). As an example, one section of the AIP controller (e.g., right panel) includes the possible one or more pipelines (e.g., one or more sensors). In one example, the pipeline includes a real-time sensor feed, or sensor feed using various protocol. In certain embodiments, the AIP allows configurations of one or more outputs. In some examples, the AIP and/or the model pipeline allows streaming outputs to one or more processors (e.g., plug and play) for one or more downstream processing (e.g., one or more models), including but not limited to object detection algorithms, tracking algorithms, geo-registration algorithms, calibrations (e.g., calibrations in the satellite imagery), pan sharpening, image enhancement, and/or the like. In one example, a video as an example of an output can be viewed in a downstream system. As example, the AIP may provide a direct pass-through of sensor data or processed sensor data.

In some examples, the AIP controller can include a live video player on an UI (user interface) section (e.g., a pop-up section, the left section) which is playing the outputs of the processing data on the right. In one example, the AIP is deployed to a ruggedized computing device. As an example, the AIP is deployed to a ruggedized laptop that a soldier may have out in the field, that he's like viewing from like an overhead aircraft on the left, and then on the right is the actual processing, for example, the processing being conducted by one or more edge devices (e.g., an edge device on the aircraft).

According to certain embodiments, the AIP and/or the AIP controller allows a change to the one or more models interfaced with the AIP, for example, a computer vision algorithm added to the pipeline of the AIP. In some embodiments, once the AIP is configured, the AIP configuration (e.g., the addition of the computer vision algorithm) can be executed (e.g., shown in the data processing pipeline). In certain embodiments, the AIP is configured to receive one or more sensor data (e.g., a frame) and preprocess the sensor data. For example, the AIP is configured to encode one or more frames into a video and send the video to a video player. In some examples, the AIP controller includes an interface (e.g., the left panel) to visualize those results.

According to some embodiments, the AIP can be used with GPS coordinates and telemetry data, which may be bouncy and not accurate. In some examples, the AIP is configured to coordinate and/or synchronize a first sensor data (e.g., a video) with a second sensor data (e.g., GPS coordinates, telemetry data). For example, the second sensor data provides geospatial location information of the first sensor data. In certain examples, the one or more sensor data is processed using a calibration processor. In some embodiments, a calibration processor may use a physics-based processing accounting filter, upsampling of metadata, do some corrections of sensors, known errors that are attributed to one or more sensors, and/or the like. In certain embodiments, the calibration processor is configured to smooth out sensor data (e.g., GPS coordinates, telemetry data).

According to certain embodiments, the AIP is configured to link the second sensor data (e.g., GPS coordinates) to the first sensor data (e.g., a video). For example, the AIP links some geospatial data to a video to actually get a sense of what a user is actually looking at. In some examples, the AIP can make the sensor data more stable. In certain embodiments, the AIP may use geo-registration to improve accuracy of sensor data. In one example, the AIP can use computer vision technique (e.g., using one or more models) that's actually matching a video frame against satellite reference imagery and updating the telemetry data. In some examples, the updated telemetry data, which is more accurate, is shown in the AIP interface (e.g., the left panel) or a downstream processing interface (e.g., showing the telematics data and positioning). In certain examples, the AIP can improve sensor data accuracy quickly (e.g., within a few seconds) using sensor data linkage, and allow direct measurement using the sensor data.

According to some embodiments, the AIP is configured to send every single video frame that the AIP receives or accesses to one or more processors to perform computer vision technique (e.g., using one or more data models) and the one or more processors are configured to send respective one or more results back the AIP. In certain embodiments, the AIP is configured to taking those results, encoding them into the video to update all those telemetry values, and then send it downstream. In one example, the AIP includes a model pipeline (e.g., an AIP pipeline, a processing pipeline), for example, as configured in the AIP controller, to process data in a calibration processor then send the calibration processing results to a geo-registration processor (e.g., a geo-registration algorithm running on a processor), so the geo-registration processor is getting the benefits of the calibration processor upstream. In this example, the AIP can run an object detection algorithm in parallel, which may not need precise geospatial accuracy corrections being calculated by the calibration and geo-registration processors which are running in parallel. In some embodiments, at least a part of the one or more processors orchestrated by the AIP can run in parallel. In one example, the geo-registration processor has to wait, before the calibration processor to perform and/or the specific budget given to the calibration sensors. In this example, this allows the geo-registration processor to utilize results (e.g., corrections) from the calibration processor running directly upstream.

According to certain embodiments, the AIP may use a fixed latency. In some embodiments, the AIP is configured to orchestrate a pipeline having one or more models (e.g., different algorithms), for example, each with corresponding predetermined (e.g., pre-configured) latency (e.g., latency budgets). In one example, when the one or more models (e.g., algorithms) are completed within their respective latency budgets, the AIP will send out the one or more results (e.g., one or more frames). As an example, if a model (e.g., an algorithm) takes longer (e.g., 2 seconds instead of 200 milliseconds), the AIP will not wait for the result (e.g., a frame) before sending it out, but rather it will immediately move on once the budget for a given processor has expired. This results in a consistent latency for every frame, it merely shifts all the video frames by that total pipeline latency. If the AIP was built to wait for models to complete, it would result in various delays for frames that would cause a compiled video to be jittering (e.g., 1 frame for 2 seconds and 30 frames in 1 second). In certain embodiments, the AIP may use a predetermined latency (e.g., a fixed budget, a specific budget) for each of one or more processors. In one example, if a processor meets the predetermined budget (e.g., 500 milliseconds) to run a corresponding model and/or algorithm, the AIP is configured to receive the result of the processor.

As an example, if the processor is quicker (e.g., shorter than 500 milliseconds) at getting the result, the AIP is configured to wait until the end of the predetermined budget, using the fixed latency and the fixed budget. In some examples, this approach allows the AIP and incorporated system to get results in fixed latency (e.g., a smooth video, a smooth video of 30 frames per second). In an example like AI and object detection (e.g., to draw boxes around all the vehicles), the AIP does not slow down the video output, for example, because the video is doing operational tasks. In one example, if one or more processors crashes or runs slow, another one or more processors (e.g., the video player) are not impacted and continue generating results (e.g., continue playing the video).

According to certain embodiments, the AIP includes functionality of doing sensor fusion. In some embodiments, the AIP can run on a number of different sensor platforms (e.g., one or more sensors on aircrafts, one or more sensors on vehicles, one or more sensors on watercrafts, one or more sensors on drones, etc.). In certain embodiments, an edge device (e.g., a sensor platform) can communicate (e.g., talk) directly to another one and agree upon one or more targets.

Figure 3:
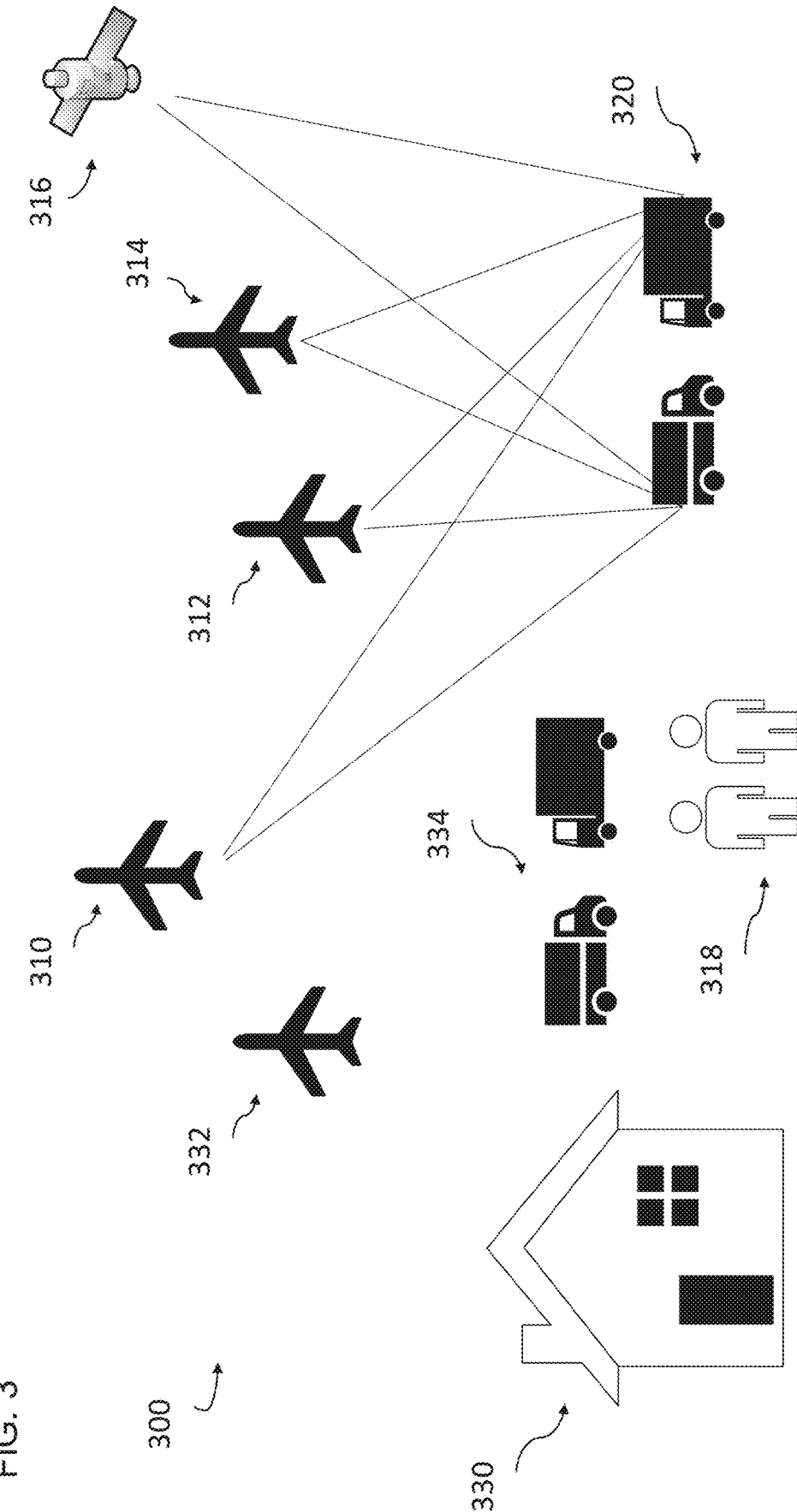
FIG. 3 is an example implementation of a deployment environment for model orchestration and sensor correlation according to certain embodiments of the present disclosure.

According to some embodiments, an example implementation of a deployment environment 300 for model orchestration and sensor correlation is illustrated in FIG. 3. FIG. 3 is merely an example. One of ordinary skill in the art would recognize many variations, alternatives, and modifications. In one example, an edge device (e.g., an aircraft and associated computing device) 310, for example, on the other side of the mountain, detects (e.g., sees) one or more targets 320 and the edge device 310 is configured to relay the detection back to a base device (e.g., base station 330) and/or one or more other edge devices (e.g., an aircraft and associated computing device 312, an aircraft and associated computing device 314, a satellite and associated computing device 316, one or more devices 318 associated with one or more persons, an aircraft and associated computing device 332, one or more vehicles and associated computing device 334). In some embodiments, a user 318 can receive AIP results, send commands, configure AIP and models, send data, and perform other activities in the AIP deployment environment.

In some embodiments, while an edge device (e.g., the aircraft 312) is collecting sensor data regarding a target (e.g., target 320) may initiate direct, and/or coordinate with another edge device (e.g., the aircraft 314) to collect sensor data regarding the same target (e.g., target 320). In one example, an edge device may launch another edge device to collect sensor data regarding the same target, for example, collecting images and/or videos from a different angle to see whether the target is a certain type of object of interest. In certain embodiments, two or more edge devices are configured to collect sensor data and confirm, for example, by one of the two or more edge devices or another control device, that the collected sensor data from the two or more edge devices are associated with the same target. In some examples, the collected sensor data from the two or more edge devices are associated with the same target from different angles. In some embodiments, a first edge device provides the location information of the target and one or more other edge devices (e.g., the satellite 316) will collect sensor data of the target based on the location information. In one example, the second edge device (e.g., the satellite 316) may identify the target to be an object of interest (e.g., a newer vehicle), and the second edge device via the AIP and/or one or more other AIPs in the AIP system incorporating one or more AIPs is configured to direct a third edge device to collect sensor data regarding the target.

According to certain embodiments, two or more edge devices may communicate with each other and make a determination that the collected sensor data is of a same target (e.g., the same vehicle). In some embodiments, the determination of the same target is done using location (e.g., space) and time information using one or more models (e.g., one or more algorithms, one or more naive algorithms). In certain embodiments, the AIP system can make a determination of the same target using one or more sensor data (e.g., image data) and one or more models (e.g., computer vision models/algorithms). In one example, a computer vision algorithm on an edge device can determine that this is a same target from one or more different angles collected from one or more edge devices.

According to some embodiments, the AIP and/or the AIP system can use one or more protocols for communications among two or more components of the AIP systems. In certain embodiments, the AIP allows making decision all the way to the edge. In some embodiments, two or more edge devices each may have one or more sensors and may be at a location different from each other. In one example, the sensors at the two or more edge devices are configured to collect data regarding a same target (e.g., cameras taking pictures at the same target). In certain embodiments, the AIP and/or the AIP system can synchronize respective AIPS and two or more edge devices (e.g., the four edge devices 310, 312, 314, 316) that are collecting data associated with the same target. In some embodiments, the AIP and/or the AIP system can synchronize two or more edge devices to enhance the accuracy (e.g., the accuracy of the detection).

According to certain embodiments, one or more user devices (e.g., a server, a base station, a center station, a center node, a computing device at a mothership, etc.) can perform higher level jobs including, for example, further processing than the edge processing. In some embodiments, two or more user devices are configured to perform higher level jobs. In one example, the AIP includes a video player. In one example, the AIP and/or the AIP system is configured to receive sensor data (e.g., detection data) from multiple edge devices (e.g., edge devices at multiple places) and the AIP determines that the sensor data is of the same section. In this example, the AIP may provide a view of multiple sections (e.g., four boxes) with sensor data collected from multiple edge devices on the same target (e.g., the vehicle). As an example, the AIP including a view of multiple sections is shown at an edge device. In some examples, the synchronization of sensor data collected by two or more edge devices is conducted at one or more edge devices and/or one or more user devices. In certain embodiments, the AIP allows a configuration to the pipeline for data transmissions, data processing, and data synchronizations, and/or other functions. As an example, the AIP allows the configuration of the output of a pipeline to view and where to send data. In one example, the AIP can be set up that the video will only be sent to a ground station (e.g., the base station 330) from an edge device. As an example, the AIP and/or the AIP system can be set up that the video will be sent to an edge device, for example, because it's a higher-powered aircraft and it has a better communication bandwidth, so it's able to send the video down to the ground station.

According to some embodiments, the AIP and/or the AIP system may use a low bandwidth protocol for communication, for example, XML messages, target location coordinates, and/or the like. In certain embodiments, the AIP and/or the AIP system may transmit metadata (e.g., small pieces of metadata, location coordinates, GPS coordinates, etc.). In one example, the AIP and/or the AIP system may broadcast data on a communication network (e.g., a tactical radio network) and then any devices on the communication network can listen to that. In one example, the AIP and the associated edge device may take certain information and uses it with its local sensor, for example, a sensor of a high-definition camera. In certain embodiments, the AIP and/or the AIP system may receive sensor data from a communication network, correlate the received data and use it with its local sensor, generate a consolidated output, and send out a consolidated output to one or more edge devices and/or one or more user devices (e.g., the ground).

According to certain embodiments, the AIP and associated edge device may send video, with or without processing (e.g., overlaid). In some embodiments, the AIP and associated edge device sends metadata (e.g., metadata associated with the video), for example, because the associated edge device does not have bandwidth and/or capability to send out video. As an example, the AIP system includes a camera that's online in the air, but the AIP system does not allow watching the video because the AIP system cannot downlink all that data, so there is where edge AI becomes important because the AIP system is running these capabilities on the edge device (e.g., an aircraft) directly next to the sensor. In some embodiments, the AIP and associated edge device is able to process the sensor data collected by one or more edge devices, generate an output, consolidate the output, and send the consolidated output to one or more edge devices and/or one or more user devices (e.g., down to the ground). In one example, the consolidated output is not an entire video and has smaller data size than a video.

As an example, the AIP and associated edge device collect a video frame and detect one truck in the middle. In one example, the AIP and associated edge device is configured to reduce the video frame, for example, by chip out the pixels of just the truck and only send that out. For example, the sensor data collected is like 5 to 20 megabits a second and the AIP generates consolidated data like 100 kilobits per second. In some examples, the AIP and/or the AIP system is configured to perform data compression (e.g., a massive amounts of compression) based on the AI that is running onboard to set down specific targets and coordinates and also a little picture of them, so a user (e.g., an operator) can see what the AIP and/or the AIP system actually looking at. In some embodiments, the AIP may broadcast a message at a communication network (e.g., a radio network), and any devices on the network can pick it up and consume the message information. In certain embodiments, the AIP may consolidate output and send it to the ground.

According to some embodiments, a meta constellation system can bring together a number of satellite providers together to perform one or more tasks (e.g., efficiently perform one or more tasks), including one or more tasks across constellations. In some embodiments, the AIP can be deployed on one or more satellites and can run AI directly on the one or more satellite so more features of meta constellation can be implemented and more satellites can be taken advantage of.

According to certain embodiments, the AIP can be used in a meta-constellation system. In some examples, the meta-constellation system allows a user to provide a request or post a question (e.g., "monitor this port", "find a ship", "report if anything interesting happens at this port"). In certain examples, in response to the request or question, the meta-constellation system may perform a corresponding task (e.g., monitor a specific area, take a picture for a fly-by object). In some examples, a meta-constellation system includes a bunch of satellites (e.g., a bunch of satellites across a bunch of different companies). In certain examples, a meta-constellation system can make a decision at the edge (e.g., at a satellite), for example, using one or more AIPs and associated capabilities. In some examples, the meta-constellation system is configured to piece together capabilities of one or more sensors, capabilities of one or more models (e.g., different AI capabilities) in response to the specific question and/or request.

According to some embodiments, the AIP and/or the senor fusion can make device constellation (e.g., meta-constellation) more powerful (e.g., much more powerful). For example, a version of device constellation (e.g., meta-constellation) is to task with, for example, edge AIs, adapters, and the integration, so the device constellation (e.g., meta-constellation) system can task and collect data (e.g., imagery, video, SAR) from one or more different sensors that the system has access to. In one example, the meta-constellation system includes a user interface (UI) and a user can make a decision about what to do next. In certain examples, the meta-constellation system can include a satellite communicating directly to one or more edge devices (e.g., aircrafts), collecting sensor data, and make decisions.

According to certain embodiments, the AIP is configured to use dependency management, for example, to reduce the resources used by the AIP (e.g., lightweight, optimized). In some embodiments, the AIP can run on one or more X-86 processors and/or one or more ARM processors. In some examples, the AIP is configured to select dependencies to be included. In certain examples, the AIP is configured to select one or more functionalities implemented in streamlined fashion, such that the computing resource usage can be trimmed down.

According to some embodiments, the AIP and/or the AIP controller (e.g., AIP configuration application, the orchestration controller) can run locally (e.g., on a laptop, approximate to an edge device). In certain examples, the AIP and/or the AIP controller does not require downloading one or more models (e.g., java scripts). In some embodiments, the AIP can be remotely configured, and the one or more selected models (e.g., stored locally) can be loaded at the edge device for deployment. In certain embodiments, the AIP can use a low bandwidth communication (e.g., a call, a message, etc.) to select one or more models, and the one or more selected models will run locally. In some embodiments, at least one of the one or more selected models can be sent and committed at an edge device (e.g., a computing device on an aircraft, a computing device on a satellite). In some embodiments, the AIP allows remote configuration for the one or more associated edge devices, one or more selected models, one or more associated sensors. For example, a user may perform a remote configuration to make changes to the AIP, save the changes, and then commit the changes. In certain embodiments, changes can be pushed to one or more edge devices. In some embodiments, a user can remotely manage a number of AIPs.

According to certain embodiments, the AIP can have compatibility with one or more protocols, for examples, one or more video codecs, one or more streaming protocols. In some embodiments, the AIP allows custom sources and custom synchronizations. In some examples, the AIP allows the configuration of one or more processors (e.g., 4 processors). In certain embodiments, the AIP can configure a container, one or more ports, and/or one or more stacks for one or more processors. In certain embodiments, after the AIP is configured, the container (e.g., a software container) can be deployed. In certain embodiments, the AIP can configure an output, multiple outputs, and/or a customer output. In one example, the AIP selects one plugged-in, for example, by setting a custom place to send information.

According to some embodiments, the AIP and/or the AIP system (e.g., the AIP controller, the orchestration controller) can provide resource management, for example, setting up one or more processors, interfacing (e.g., wiring) the one or more processors in AIP, interfacing with one or more sensors in AIP, interfacing with one or more models in AIP, and/or the like. As an example, the AIP can manage resources and different models, run them at the right time, perform load balance, and/or the like. In some embodiments, the AIP can manage hardware space, for example, a variety of different form factors. In certain embodiments, the AIP can manage one or more sensors, for example, the one or more types of the sensors, the sensor processing (e.g., RF processing), the sensor control (e.g., the sensor aircraft and various things).

According to some embodiments, the AIP can be used in an integrated solution, for example, an integrated solution including one or more models. In certain embodiments, the AIP can be used in building a sensor software that can be deployed in one or more sensors. In some embodiments, the sensor software can include the AIP and one or more models for processing sensor data. In certain embodiments, the AIP can provide a vendor-agnostic approach where an integrated solution can incorporate a wide variety of sensors and a wide variety of algorithms built by different vendors (e.g., one or more internally or externally built AI models). In some embodiments, the AIP allows a user to have flexibility to plug and play different models. In some examples, the AIP is configured to interface with one or more processors (e.g., one or more processors and/or models for three-dimensional (3D) reconstruction, geo-registration processors, specific calibration processors).

According to certain embodiments, the AIP can be run on one or more processors (e.g., computing processors). In one example, an AIP can be associated with (e.g., running) one or more models. As an example, an AIP includes one or more containers (e.g., one or more container software) that run and expose in API, such that the AIP can be initiated for running. In one example, the AIP can run on a GPU (e.g., a specific GPU). In some examples, the AIP can be closer to the hardware, for example, the specific resources that the AIP needs, managing one or more processors and/or associated one or more models. In certain examples, the AIP can perform one or more orchestration steps, for example, take one or more models, deploy and/or monitor the one or more models and associated devices at a specific place, send one or more messages to the one or more models, register the one or more models, and/or define one or more port associated with the one or more models.

According to some embodiments, the AIP allows remote configuration. In certain embodiments, the AIP and/or the AIP system (e.g., the AIP controller) can use low bandwidth communication, for example, the one or more messages that it sends out don't have to be used for high resolution things. In some embodiments, the AIP and/or the AIP system can achieve low latency and use low bandwidth, for example, possibly a disconnected environment. In certain embodiments, the fixed budgets (e.g., fixed latencies) of one or more processors allow the low latency and low bandwidth implementations, for example, sometimes in a completely disconnected fashion.

Figure 4:
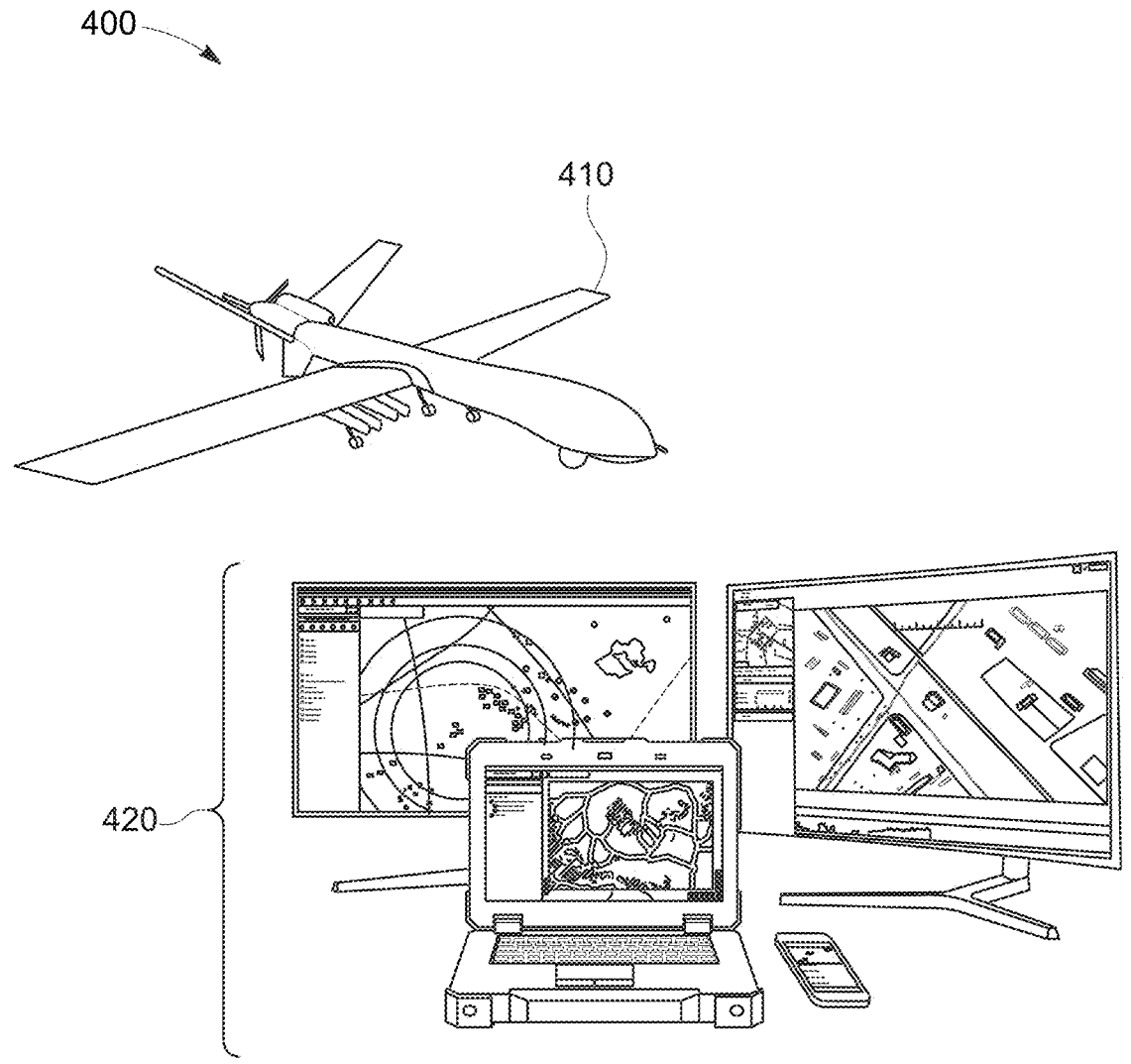
FIG. 4 is an illustrative model orchestration and sensor correlation system (e.g., an AIP system) according to certain embodiments of the present disclosure.

FIG. 4 is an illustrative model orchestration and sensor correlation system 400 (e.g., an AIP system) according to certain embodiments of the present disclosure. FIG. 4 is merely an example. One of ordinary skill in the art would recognize many variations, alternatives, and modifications. In some embodiments, the AIP system 400 includes one or more edge devices 410 and a development and management platform (DMP) (e.g., an AIP controller, including an AIP controller, including an orchestration controller) 420. In certain embodiments, the edge devices 410 run one or more AIPs onboard, for example, with the one or more models. In some embodiments, the DMP 420 includes one or more orchestration controllers (e.g., the AIP controller 118 illustrated in FIG. 1). In certain embodiments, the DMP 420 is configured to develop, evaluate, deploy, and update AIPs with interfaced one or more models to the edge device 410. In some embodiments, the edge devices 410 can be deployed to one or more satellites.

According to certain embodiments, the DMP 420 manages AIP(s) associated with the edge device 410. In some embodiments, the DMP 420 manages AIP(s) associated with the edge device 410 via an AIP controller. In certain embodiments, an AIP includes an indication of a model pipeline (e.g., a processing pipeline) including one or more computational models, for example, running on a model service. In some embodiments, the DMP 420 is configured to select two or more models to run in parallel in the model pipeline, where a first model's input has a first data format and a second model's input has a second data format. In certain examples, the first data format is the same as the second data format. In some examples, the first data format is different from the second data format. In certain embodiments, the DMP 420 is configured to select two or more models to run in sequence in the model pipeline, where a first model's output is an input to a second model. In some embodiments, the DMP 420 is configured to select two or more models running in parallel, where the two or more models generate respective model outputs provided to a third model. In certain embodiments, the third model has a software interface to receive results from the two or more models. In some embodiments, the model pipeline includes an input vector to receive data from the data API (e.g., the data API 112 in FIG. 1), one or more models, and an output vector to output data, for example, via the inference API (e.g., the inference API 114 in FIG. 1).

FIG. 5 is an illustrative AIP system 500 according to certain embodiments of the present disclosure. FIG. 5 is merely an example. One of ordinary skill in the art would recognize many variations, alternatives, and modifications. In some embodiments, the AIP system 500 includes or interfaces with one or more AIPs 510 running on edge devices, one or more data feed 520 (e.g., video, imagery, etc.), a data management platform 530, one or more decision-making applications 540, and one or more feedback mechanism 550. In some embodiments, the edge devices, by running the AIPs 510, can perform real-time AI/ML on the edge. In certain embodiments, the one or more feedback mechanism 550 is via software interface, user interface, and/or other input mechanism and communication mechanism. As used herein, in some embodiments, feedback includes one or more of commands, controls, results, and messages. In certain embodiments, the AIP system 500 receives the feedback 550 via an orchestration controller. In some embodiments, the AIP system 500 can update, retrain, select, and/or delete one or more models based on the feedback. In certain embodiments, the decision-making applications 540 can provide feedback to the AIPs 510. In some embodiments, the decision-making applications 540 can provide feedback to the data management platform 530.

Figure 6:
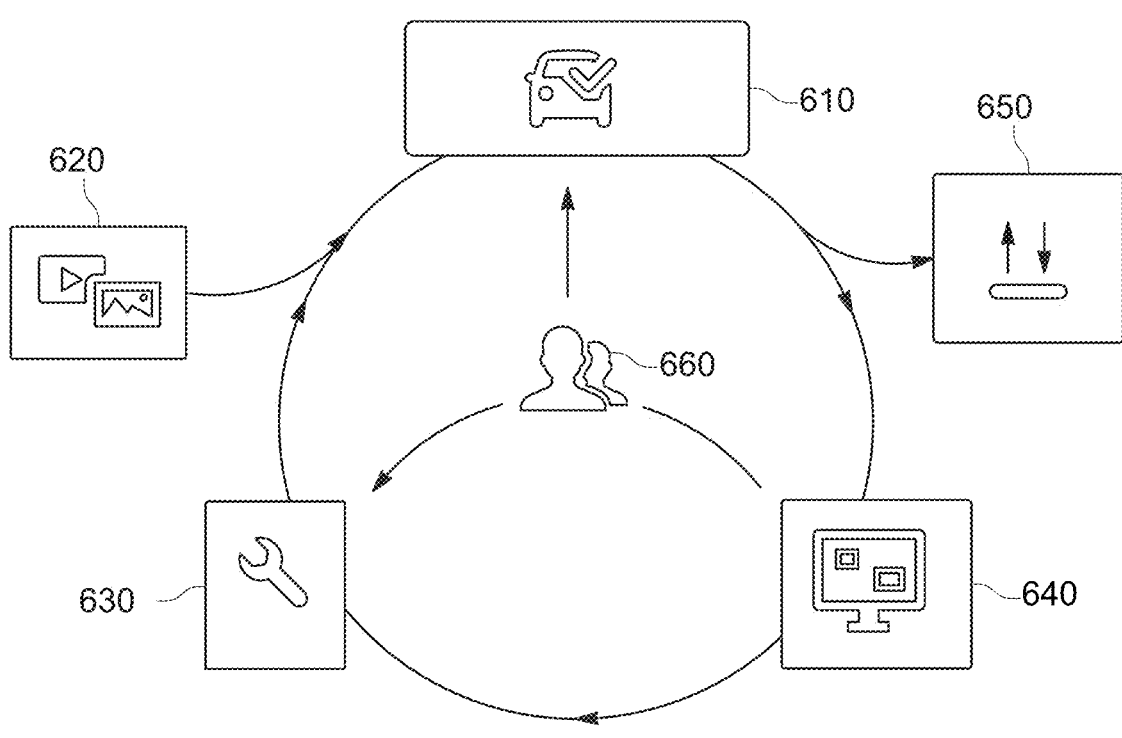
FIG. 6 is an illustrative AIP system according to certain embodiments of the present disclosure.

FIG. 6 is an illustrative AIP system 600 according to certain embodiments of the present disclosure. FIG. 6 is merely an example. One of ordinary skill in the art would recognize many variations, alternatives, and modifications. In some embodiments, the AIP system 600 includes or interfacing with one or more AIPs 610 running on edge devices, one or more data feed 620 (e.g., video, imagery, etc.), an AI platform 630 for training, evaluating, deploying, and managing AI/ML, one or more analytics software 640 for capturing, analyzing, and understanding trends on historical data 640, one or more external systems 650 to communicate with other devices locally, and one or more feedback mechanism 660. In some embodiments, the edge devices, by running the AIPs 610, can perform real-time AI/ML on the edge. In certain embodiments, the one or more feedback mechanism 660 is via software interface, user interface, and/or other input mechanism and communication mechanism. As used herein, in some embodiments, feedback includes one or more of commands, controls, results, and messages. In some embodiments, the AIP system 600 can update, retrain, select, and/or delete one or more models based on the feedback. In certain embodiments, the analytics software 640 can provide feedback to the AIPs 610. In some embodiments, the analytics software 640 can provide feedback to the AI platform 630.

Figure 7:
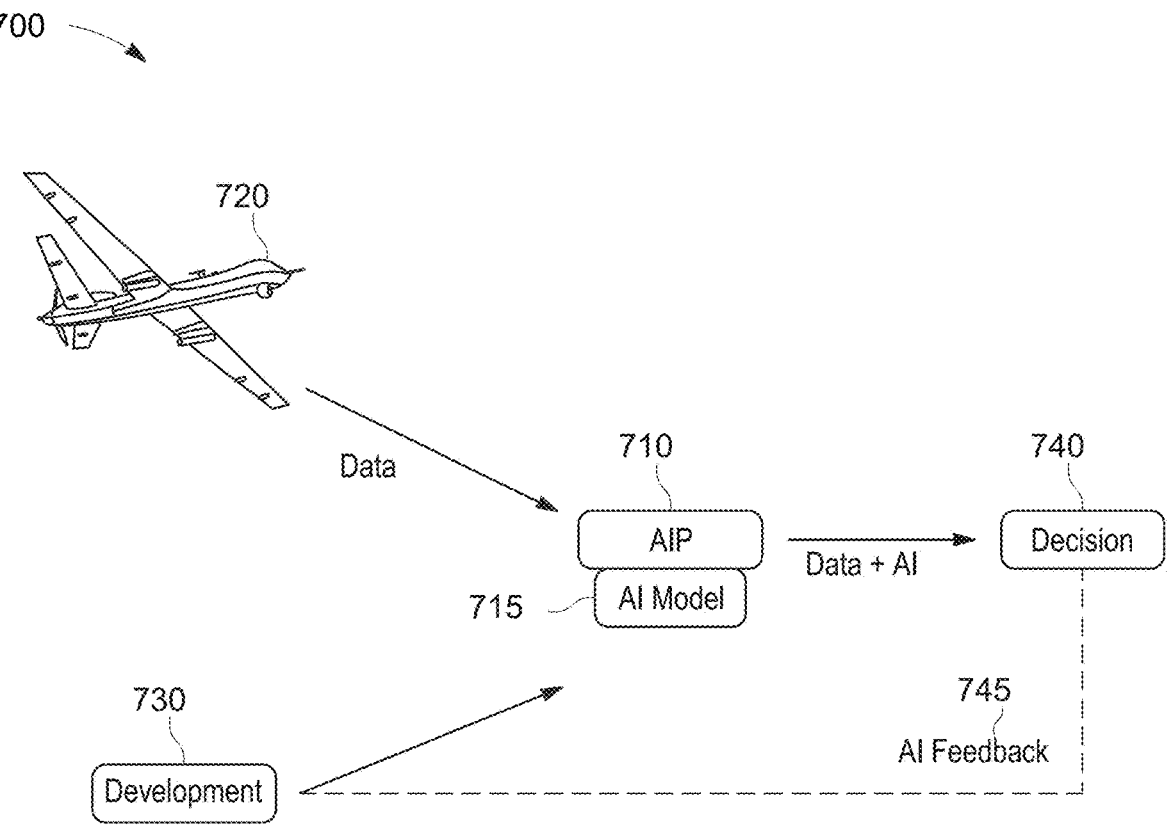
FIG. 7 is an illustrative flow diagram for an AIP system according to certain embodiments of the present disclosure.

FIG. 7 is an illustrative flow diagram for an AIP system 700 according to certain embodiments of the present disclosure. FIG. 7 is merely an example. One of ordinary skill in the art would recognize many variations, alternatives, and modifications. In some embodiments, the AIP system includes one or more AIPs 710, one or more AI models 715 interfaced with the AIPs 710, and one or more edge device 720 running at least one of the one or more AIPs 710, a decision system 740, and a development system (e.g., a development and management platform, DMP) 730. In certain embodiments, the one or more AIPs 710 receive data (e.g., video data) from the one or more edge devices 720 and orchestrate the one or more AI models 715 to the received data (e.g., live sensor feed, real-time video data). In some embodiments, the one or more AI models 715 are applied to the data received from the one or more edge devices 720 and generate data and AI results to be sent via the one or more AIPs 710. In certain embodiments, the decision system 740 processes the data and AI results to generate one or more decisions and AI feedback 745. In some embodiments, the AIP feedback 745 is used by the development system 730 (e.g., a DMP) of the one or more AIPs 710 and the one or more AI models 715. In certain embodiments, the development system 730 holds the training data and models. In some embodiments, new models, including updated models, are pushed or published from the development system 730 to the AIP 710 (e.g., AIPs globally).

Figure 8:
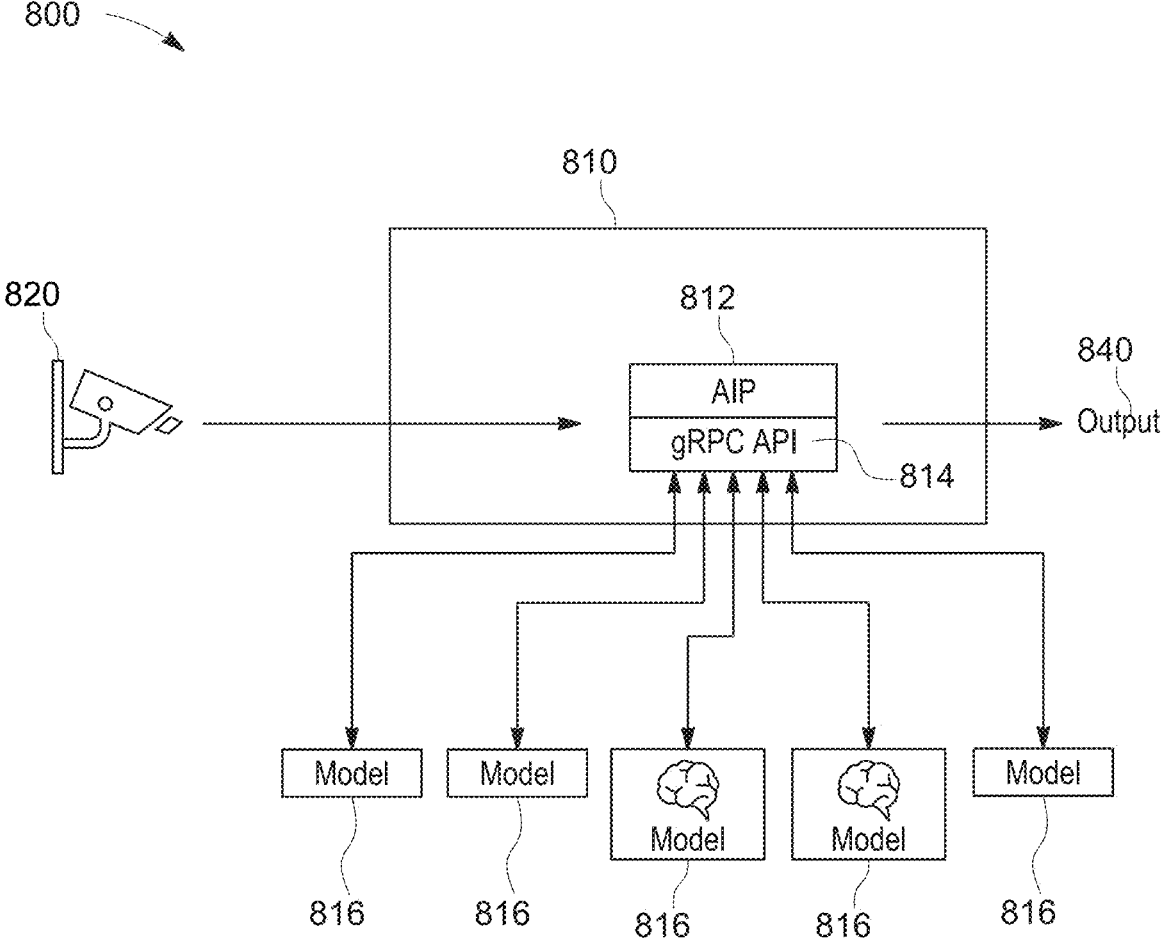
FIG. 8 is an illustrative example of an AIP system according to certain embodiments of the present disclosure.

FIG. 8 is an illustrative example of an AIP system 800 according to certain embodiments of the present disclosure. FIG. 8 is merely an example. One of ordinary skill in the art would recognize many variations, alternatives, and modifications. In some embodiments, the AIP system 800 includes an AIP 812, an edge device 820, and one or more models 816. In certain embodiments, the edge device 820 can generate one or more of FMV (full motion video), CCTV (closed-circuit television), satellite imagery, ELINT (electronic signals intelligence)/SIGINT (signal intelligence) (e.g., scoping), audio (e.g., scoping), and/or acoustics (e.g., scoping). In some embodiments, the AIP 812, by applying the one or more models (e.g., a stabilization and calibration model, a georegistration model, one or more AI models, a tracker model) to the received data, generates one or more outputs, such as a video (e.g., MPEG-TS video), video combined with georegistered telemetry data and AI outputs, cursor-on-target (CoT) data, HLS-AVRO data, JSON data (e.g., an open standard data-interchange format), and/or the like.

FIG. 9 is an illustrative example of features 900 of an AIP system according to certain embodiments of the present disclosure. FIG. 9 is merely an example. One of ordinary skill in the art would recognize many variations, alternatives, and modifications. In some embodiments, the AIP system has deployability management features 910, including one or more of: using standard Java Witchcraft service; deploying via deployment services when deployed on ground or in cloud; deploying via delta scripts when on the edge; and/or when edge devices are disconnected. In certain embodiments, the AIP system has hardware features 920, including one or more of: utilizing GPUs; edge is typically ARM based hardware; and/or SWaP optimizations. In some embodiments, the AIP system has dependency features 930, including one or more of: no dependencies to a data management system or a decision system; and/or that it is commonly deployed on the edge. In certain embodiments, the AIP system has processing features 940, including one or more of: built by 3$^{rd}$ party companies (e.g., AI companies); requiring access to GPU resources to be performant; deployed as docker containers which expose an AIP; and/or built internally as a standard Java Witchcraft service.

Figure 10:
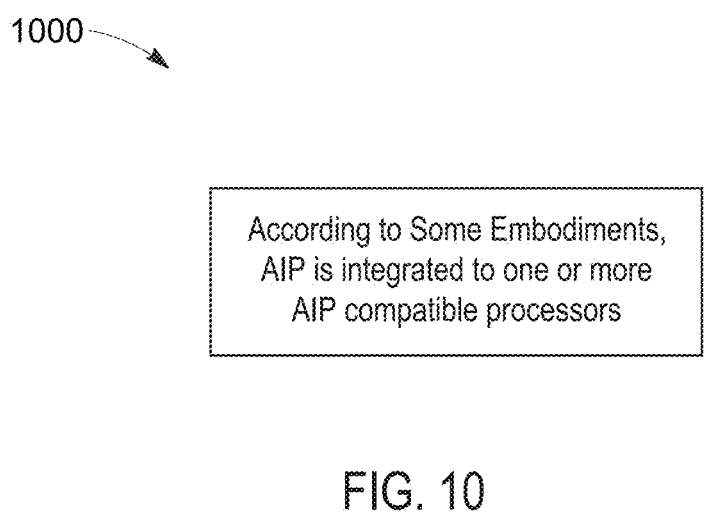

FIG. 10 is an illustrative diagram of an AIP system 1000 according to certain embodiments of the present disclosure. FIG. 10 is merely an example. One of ordinary skill in the art would recognize many variations, alternatives, and modifications. In some embodiments, the AIP system 1000 includes an AIP is integrated to one or more AIP compatible processors.

Figure 11:
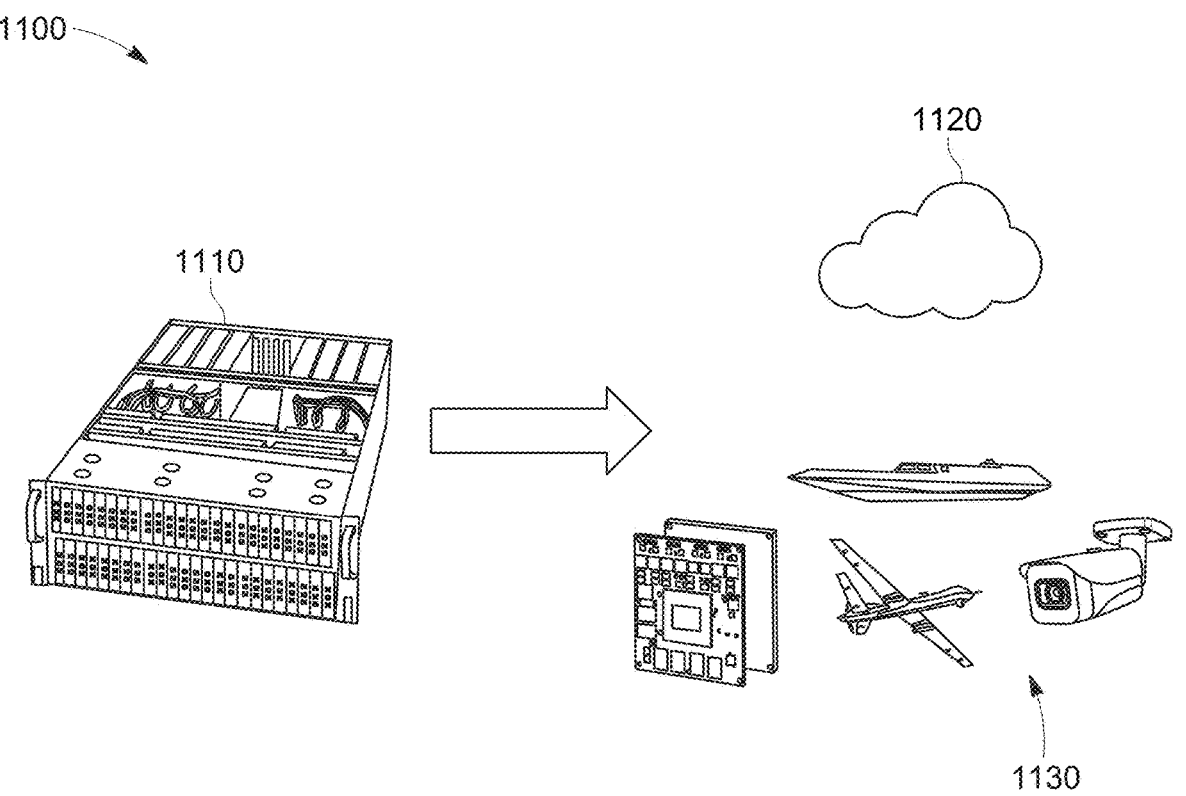
FIG. 11 is an illustrative comparison 1100 of a conventional system and an AIP system according to certain embodiments of the present disclosure.

FIG. 11 is an illustrative comparison 1100 of a conventional system 1110 and an AIP system 1120 according to certain embodiments of the present disclosure. FIG. 11 is merely an example. One of ordinary skill in the art would recognize many variations, alternatives, and modifications. In some embodiments, the AIP system 1120 includes components running on the cloud servers 1140 and running on the edge devices 1130. In certain embodiments, the functionality of the conventional system 1110 (e.g., on-premise racks of servers) is pushed into cloud and edge. In some embodiments, the components running on the cloud servers 1140 is dynamically spinning up/down instances of AIP to efficiently provision resources. In certain embodiments, edge devices 1130 include limited computing and/or communication resources (e.g., commonly communications denied environment).

Figure 12:
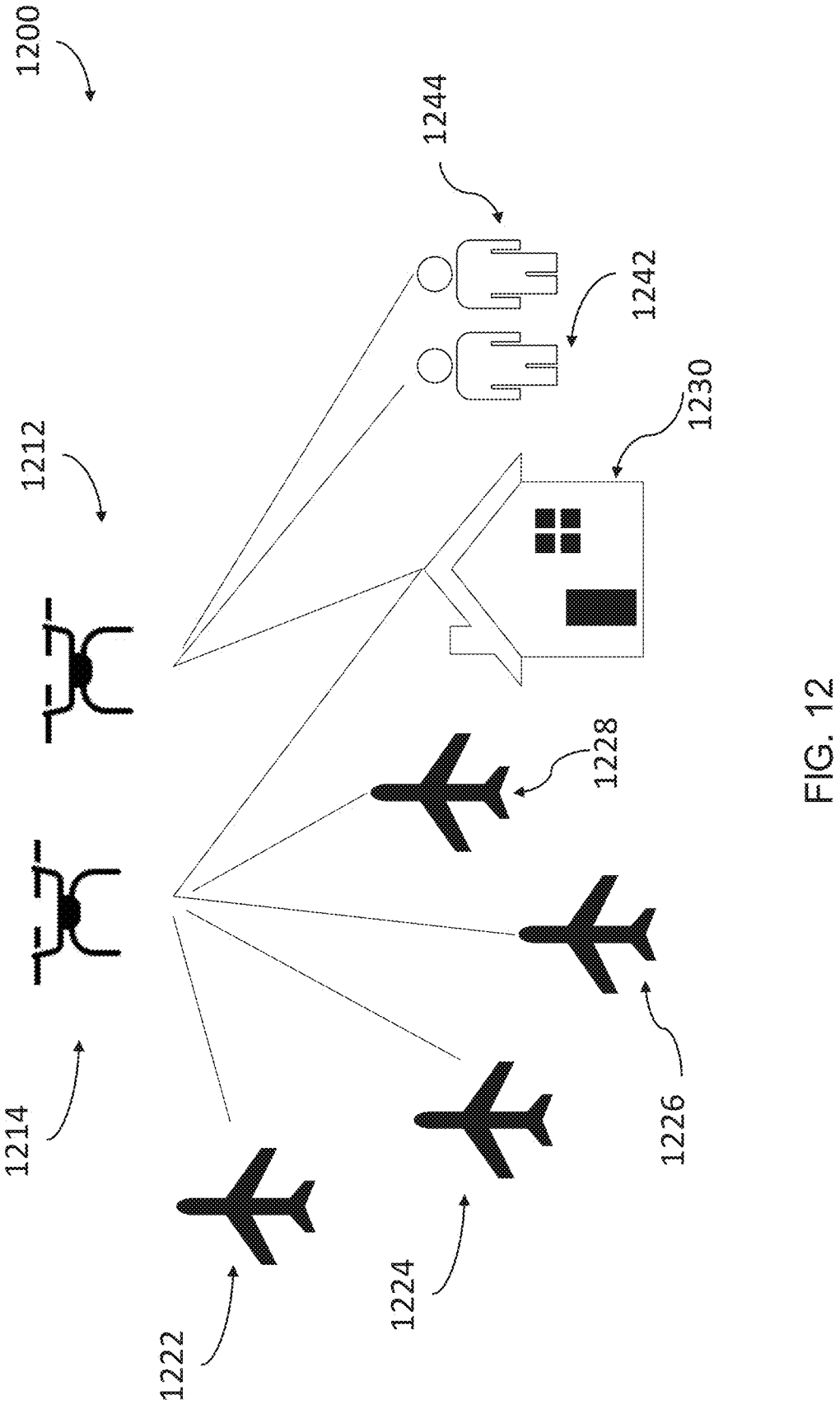
FIG. 12 is an illustrative conventional sensor environment according to certain embodiments of the present disclosure.

FIG. 12 is an illustrative conventional sensor environment 1200 according to certain embodiments of the present disclosure. FIG. 12 is merely an example. One of ordinary skill in the art would recognize many variations, alternatives, and modifications. According to certain embodiments, the sensor environment 1200 includes one or more edge devices 1212, 1214, 1222, 1224, 1226, 1228, a base station 1230, and one or more users 1242 and 1244. In some embodiments, the edge device 1214 (e.g., an unmanned aircraft system (UAS)

with associated computing device(s)) is configured to detect or communicate to the other edge devices 1222, 1224, 1226, and 1228.

In certain examples, the edge device 1214 communicates with the base device 1230. In some examples, UAS are flown by pilots and teams on the ground and the processing of data are applied on the ground. In certain examples, such system has bandwidth constraints limiting data flow. In some examples, such system may have latency issues due to multiple hops before decisions can be made.

Figure 13:
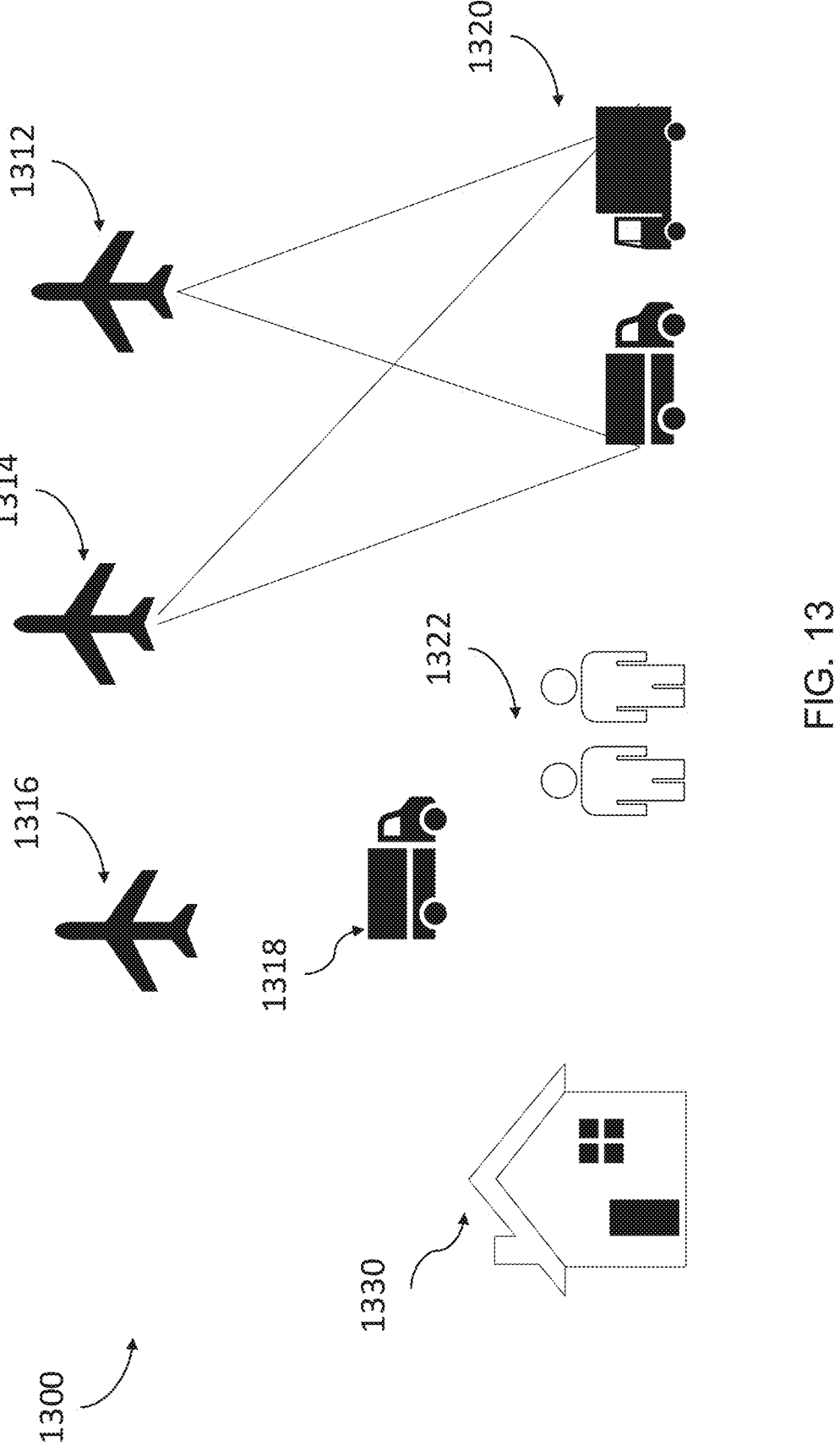
FIG. 13 is an illustrative model orchestration and sensor correlation environment according to certain embodiments of the present disclosure.

FIG. 13 is an illustrative model orchestration and sensor correlation environment 1300 according to certain embodiments of the present disclosure. FIG. 13 is merely an example. One of ordinary skill in the art would recognize many variations, alternatives, and modifications. According to certain embodiments, the model orchestration and sensor correlation environment (e.g., an AIP system, a model orchestration and sensor correlation system) 1300 includes one or more edge devices 1312, 1314, 1316, 1318, a base device 1330, a target 1320, and one or more user devices 1322. In some embodiments, the edge device 1312 and/or 1314 (e.g., an unmanned aircraft system (UAS) with associated computing device(s), an aircraft with associated computing device(s)) is configured to detect the target 1320. In certain embodiments, one or more of, or each of, the edge devices (e.g., edge devices 1312, 1314, 1316, 1318) run or are associated with one or more model orchestrators (e.g., AIPs) and/or one or more orchestration controllers (e.g., AIP controllers).

According to certain embodiments, FIG. 13 shows edge progression (e.g., additional processing at the edge devices). In some embodiments, the edge device 1312 and/or 1314 (e.g., an unmanned aircraft system (UAS) with associated computing device(s), an aircraft with associated computing device(s)) is configured to process data, for example, using one or more models associated with the AIPs, such that only a small set of data (e.g., critical data) is pushed over the network. In certain embodiments, the model orchestration and sensor correlation system can enable near-zero latency decision-making (e.g., decision-making at the edge). In some embodiments, the model orchestration and sensor correlation system can upload the request (e.g., mission) rather than specific commands. In certain embodiments, the model orchestration and sensor correlation system (e.g., platforms) can communicate directly with each other to delegate and/or team on tasks.

According to some embodiments, the edge device (e.g., an aircraft and associated computing device) 1312, for example, on the other side of the mountain, detects (e.g., sees) one or more targets 1320 and the edge device 1312 is configured to relay the detection back to a base device (e.g., base station 330) and/or one or more other edge devices (e.g., the edge device 1314, the edge device 1318, an edge device in the air, an edge device on the ground). In some embodiments, a user device 1322 can receive AIP results, send commands, configure AIP and models, send data, and perform other activities in the AIP deployment environment.

In some embodiments, while an edge device (e.g., the edge device 1312) is collecting sensor data regarding a target (e.g., target 1320) may initiate direct, and/or coordinate with another edge device (e.g., the edge device 1314) to collect sensor data regarding the same target (e.g., target 1320). In certain embodiments, an edge device may launch another edge device to collect sensor data regarding the same target, for example, collecting images and/or videos from a different angle to see whether the target is a certain type of object of interest. In certain embodiments, two or more edge devices are configured to collect sensor data and confirm, for example, by one of the two or more edge devices or another control device, that the collected sensor data from the two or more edge devices are associated with the same target. In some examples, the collected sensor data from the two or more edge devices are associated with the same target from different angles. In some embodiments, a first edge device provides the location information of the target and one or more other edge devices (e.g., the edge device 1314) will collect sensor data of the target based on the location information. In one example, the second edge device (e.g., the edge device 1314) may identify the target to be an object of interest (e.g., a newer vehicle), and the second edge device via the AIP and/or one or more other AIPs in the AIP system incorporating one or more AIPs is configured to direct a third edge device (e.g., the edge device 1314) to collect sensor data regarding the target.

According to certain embodiments, two or more edge devices may communicate with each other and make a determination that the collected sensor data is of a same target (e.g., the same vehicle). In some embodiments, the determination of the same target is done using location (e.g., space) and time information using one or more models (e.g., one or more algorithms, one or more naive algorithms). In certain embodiments, the AIP system can make a determination of the same target using one or more sensor data (e.g., image data) and one or more models (e.g., computer vision models/algorithms). In one example, a computer vision algorithm on an edge device can determine that this is a same target from one or more different angles collected from one or more edge devices.

According to some embodiments, the AIP and/or the AIP system can use one or more protocols for communications among two or more components of the AIP systems. In certain embodiments, the AIP allows making decision all the way to the edge. In some embodiments, two or more edge devices each may have one or more sensors and may be at a location different from each other. In one example, the sensors at the two or more edge devices are configured to collect data regarding a same target (e.g., cameras taking pictures at the same target). In certain embodiments, the AIP and/or the AIP system can synchronize respective AIPs and two or more edge devices (e.g., the edge devices 1312, 1314, 1316, 1318) that are collecting data associated with the same target. In some embodiments, the AIP and/or the AIP system can synchronize two or more edge devices to enhance the accuracy (e.g., the accuracy of the detection).

According to certain embodiments, one or more user devices (e.g., a server, a base station, a center station, a center node, a computing device at a mothership, etc.) can perform higher level jobs including, for example, further processing than the edge processing. In some embodiments, two or more user devices are configured to perform higher level jobs. In one example, the AIP includes a video player. In one example, the AIP and/or the AIP system is configured to receive sensor data (e.g., detection data) from multiple edge devices (e.g., edge devices at multiple places) and the AIP determines that the sensor data is of the same section. In this example, the AIP may provide a view of multiple sections (e.g., four boxes) with sensor data collected from multiple edge devices on the same target (e.g., the vehicle). As an example, the AIP including a view of multiple sections is shown at an edge device. In some examples, the synchronization of sensor data collected by two or more edge devices is conducted at one or more edge devices and/or one or more user devices. In certain embodiments, the AIP allows a configuration to the model pipeline via an orchestration controller for data transmissions, data processing, and data synchronizations, and/or other functions. As an example, the AIP allows the configuration of the output of a pipeline to view and where to send data. In one example, the AIP can be set up that the video will only be sent to a ground station (e.g., the base station 1330) from an edge device. As an example, the AIP and/or the AIP system can be set up that the video will be sent to an edge device, for example, because it's a higher-powered aircraft and it has a better communication bandwidth, so it's able to send the video down to the ground station.

Figure 14:
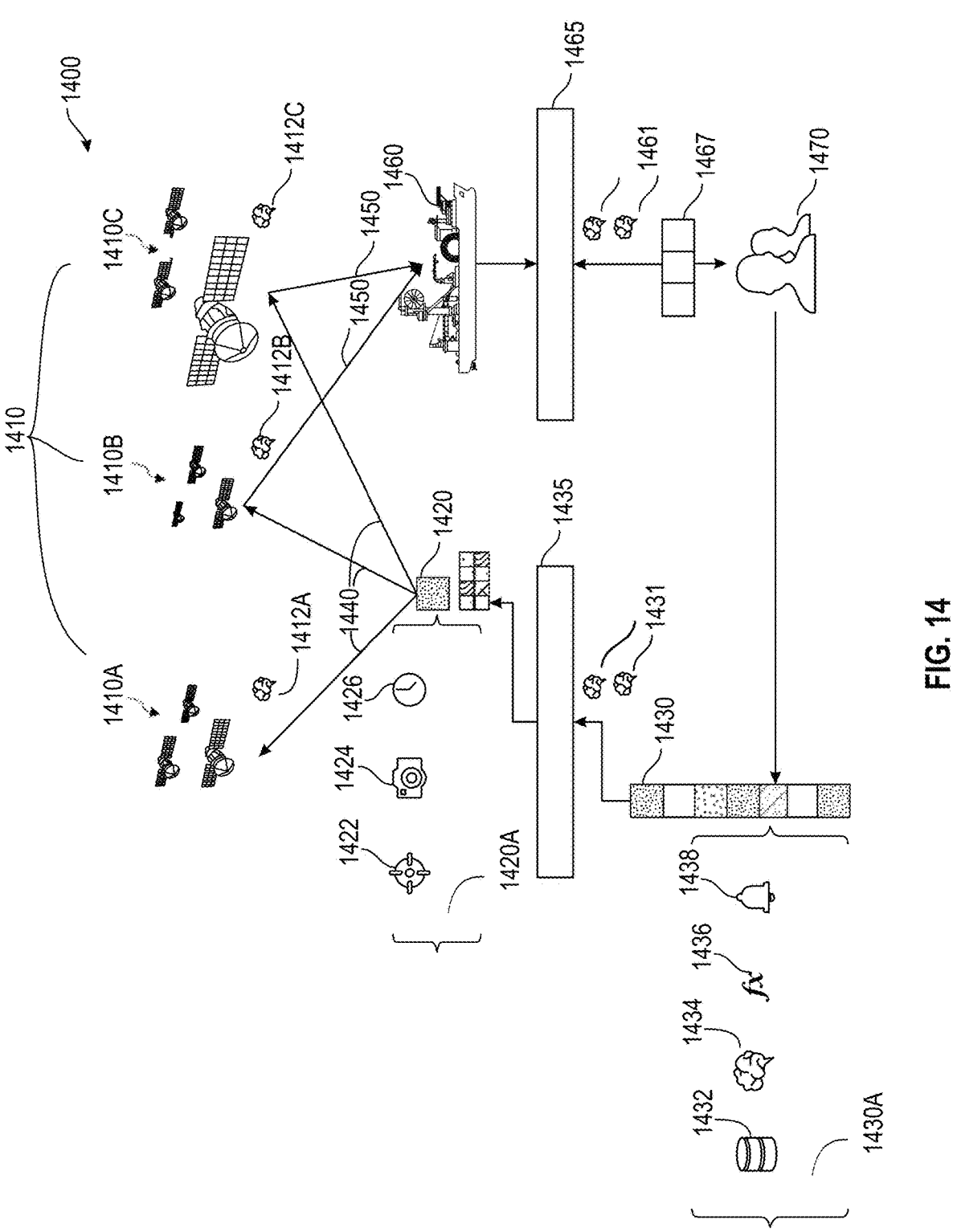
FIG. 14 is an illustrative device constellation environment using model orchestration and sensor correlation according to certain embodiments of the present disclosure.

FIG. 14 is an illustrative device constellation environment 1400 (e.g., a device constellation system, an AI meta-constellation system, a model orchestration and sensor correlation system) using model orchestration and sensor correlation according to certain embodiments of the present disclosure. FIG. 14 is merely an example. One of ordinary skill in the art would recognize many variations, alternatives, and modifications. In certain embodiments, the device constellation system 1400 includes one or more edge device constellations 1410, a collection request queue 1420, a monitor request queue 1430 (e.g., an algorithm request queue), a constellation engine (e.g., a correlation engine) 1435, and an operational engine 1465. In some embodiments, the device constellation system 1400 provides a way for efficient use of edge devices (e.g., edge devices disposed on satellites). In certain embodiments, the constellation engine 1435 and/or the operational engine 1465 are integrated with or associated with an orchestration controller (e.g., the orchestration controller 118 in FIG. 1).

According to certain embodiments, the one or more edge device constellations 1410 includes a first edge device constellation 1410A (e.g., one or more edge devices in a group, one or more computing devices disposed on or integrated with one or more satellites, etc.), a second edge device constellation 1410B (e.g., one or more edge devices in a group, one or more computing devices disposed on or integrated with one or more satellites, etc.), and a third edge device 1410C (e.g., one or more edge devices in a group, one or more computing devices disposed on or integrated with one or more satellites, etc.). In some embodiments, one or more of the edge device constellations 1410 include an AIP, for example, for receiving one or more requests and/or transmitting data. In certain embodiments, each edge device constellation 1410 includes a corresponding AIP and/or AIP controller 1412A, 1412B, 1412C, for example, for receiving one or more requests and/or transmitting data. In some embodiments, the device constellation system 1400 includes two or more request queues storing one or more requests to the one or more edge device constellations 1410. In certain embodiments, the queues are stored or accessible via one or more edge device constellations 1410. In some embodiments, the collection request queue 1420 includes one or more collection requests 1420A for sensor data collection. In certain embodiments, the monitor request queue 1430 includes one or more monitoring requests 1430A for monitoring and processing requests.

According to some embodiments, a collection request 1420A includes data for one or more collection parameters including, for example, one or more location and/or field-of-view parameters 1422, one or more sensor parameters 1424, one or more timing parameters 1426 (e.g., pass timing and/or revisit), and/or the like. In certain embodiments, the one or more location parameters 1422 include one or more of a geographic coordinate parameter, a latitude parameter, a longitudinal parameter, an altitude parameter, a geohash parameter, a GPS (global-positioning-system) parameter, and/or the like. In some embodiments, the one or more field-of-view parameters include one or more location parameters and one or more of an angle, an angle range, an area, and/or the like. In certain embodiments, the one or more sensor parameters 1424 include a type of sensor, a feature of sensor, a configuration of sensor, a sensing range, a sensing angle, a sensing time, and/or the like. In some examples, the sensor is an image sensor, and the sensor parameters include a zooming parameter, a resolution parameter, a frame rate parameter, a gain parameter, a binning parameter, an image format parameter, and/or the like. In certain examples, the sensor includes an acoustic sensor, a transducer, an ultrasonic sensor, an infrared sensor, a hyperspectral sensor, and/or the like. In some embodiments, the one or more timing parameters 1426 include one or more of a specific time, a specific repeated time, a time range from a beginning time to an end time, a time range periodically (e.g., daily, weekly, monthly, etc.), and/or the like.

According to certain embodiments, a monitoring request 1430A includes data for one or more monitoring parameters including, for example, contextual data 1432, one or more perception models 1434, one or more fusion functions/activity metrics 1436, one or more target criteria 1438 (e.g., downlink criteria), and/or the like. In some embodiments, the contextual data 1432 is stored in one or more data repositories. In certain embodiments, the contextual data includes historical sensor data, model parameters, object parameters, and/or the like. In some embodiments, the one or more perception models 1434 include one or more models for identifying and/or monitoring one or more target objects. In certain embodiments, the one or more perception models include one or more computer-vision models for identifying objects in images and/or videos. In some embodiments, the one or more fusion functions 1436 include one or more functions on sensor data and/or processed sensor data. In certain embodiments, the one or more activity metrics 1436 include one or more movement metrics, movement pattern metrics, and/or the like. In some embodiment, the one or more target criteria 1438 include one or more criteria associated with one or more target characteristics. In certain embodiments, the one or more target characteristics 1438 include a type of object, a size of object, a color of object, a shape of object, a feature of object, and/or the like.

According to certain embodiments, the constellation engine (e.g., the correlation engine, the orchestration controller) 1435 receives one or more requests 1430A in the monitoring queue 1430, and decompose the request into one or more tasks 1440, which combines one or more collection requests 1420A from the collection request queue 1420 and corresponding models. In some embodiments, the constellation engine 1435 selects an edge device 1410 for a task 1440, and send the task 1440 to the edge device and/or edge device constellation 1410. In certain embodiments, the constellation engine 1435 selects the edge device and/or edge device constellation 1410 based at least in part upon the task 1440. In some embodiments, the constellation engine 1435 selects the edge device 1410 based at least in part upon one or more sensor parameters in the task 1440. In certain embodiments, the constellation engine 1435 selects the edge device and/or edge device constellation 1410 based at least in part upon one or more location parameters and/or field-of-view parameters in the task 1440. In some embodiments, the constellation engine 1435 selects the edge device and/or edge device constellation 1410 based at least in part upon one or more timing parameters in the task 1440.

In certain embodiments, the constellation engine 1435 selects the edge device and/or edge device constellation 1410 based at least in part upon one or more perception model parameters in the task 1440. In certain embodiments, the constellation engine 1435 selects the edge device and/or edge device constellation 1410 based at least in part upon one or more fusion functions in the task 1440. In some embodiments, the constellation engine 1435 selects the edge device and/or edge device constellation 1410 based at least in part upon one or more activity metrics in the task 1440. In certain embodiments, the constellation engine 1435 selects the edge device and/or edge device constellation 1410 based at least in part upon one or more target criteria in the task 1440.

In some embodiments, the AIP and/or the AIP controller 1412A, 1412B, 1412C can transform a task 1440 to a corresponding model pipeline. In certain embodiments, the model pipeline includes the one or more sensor parameters and/or one or more model parameters indicating selection and configuration of models. In some embodiments, the model pipeline is deployed to an edge device for a new or updating model pipeline.

According to some embodiments, the device constellation system 1400 is configured to select one or more edge devices (e.g., a plurality of edge devices) from one or more constellations (e.g., a plurality of constellations). In some examples, each of the one or more constellations is owned by and/or operated by an entity (e.g., a government organization, a company, an industry organization, etc.). As an example, two constellations are owned by and/or operated by two different entities. In certain examples, a meta-constellation is formed including one or more edge devices from one or more constellations owned by and/or operated by various entities. For example, the system 1400 is configured to select multiple edge devices from a plurality of constellations, and each constellation of the plurality of constellations is owned by and/or operated by an entity (e.g., a government organization, a company, an industry organization, etc.). As an example, some selected multiple edge devices belong to a constellation owned by and/or operated by an entity, and other selected multiple edge devices belong to a different constellation owned by and/or operated by a different entity. In some examples, the system is configured to select one or more edge devices based on capability, eligibility, and/or availability of the corresponding edge device. For example, an edge device is a satellite that includes one or more sensors, where the one or more sensors are also referred to as orbit sensors. As an example, an edge device includes one or more sensors in the space. For example, an edge device is selected based on a viewing angle of an imaging sensor on the edge device. As an example, an edge device is selected based on its location in the water. In some examples, the system selects the edge device based upon one or more sensors and/or one or more models. For example, an edge device is selected to use a specific model to process data.

According to certain embodiments, the system 1400 and/or the constellation engine is configured to assign the one or more tasks 1440 to the one or more selected edge devices and/or edge device constellations 1410. In some embodiments, the system 1400 and/or the constellation engine is configured to assign the one or more tasks 1440 to the one or more selected edge devices and/or edge device constellations 1410 using one or more models 1431 (e.g., an optimization model, a security model etc.). According to some embodiments, the one or more selected edge devices are configured to perform the one or more assigned tasks to generate data 1450. In some examples, the one or more edge devices are configured to collect data during the performance of the one or more assigned tasks. In certain examples, the one or more edge devices are configured to process the collected data. In some examples, the edge device is configured to generate one or more insights by processing the data collected by one or more sensors on the edge device and/or data collected by one or more sensors on one or more other edge devices. In certain examples, the generated data 1460 by the one or more selected edge devices includes the collected data, the processed data, the one or more insights, fused processed data (e.g., fused AI data), and/or a combination thereof. As an example, an edge device is assigned with a task of monitoring a space area for two weeks and is configured to filter the monitoring data (e.g., removing certain data). For example, an edge device is assigned with a task of detecting wildfire and is configured to process data collected from various sensors on the edge device and transmit an insight of whether wildfire is detected.

According to some embodiments, the system 1400 and/or the constellation engine 1435 is configured to request a source edge device to transmit data (e.g., collected data and/or processed data) to a destination edge device. In some examples, the destination edge device is configured to process data from the source edge device. In certain examples, the system is configured to move more complex processing to the one or more edge devices. In certain examples, two or more edge devices are configured to transmit data to a selected edge device for data processing.

According to certain embodiments, the system 1400 and/or the operation engine 1465 (e.g., the orchestration controller) are configured to generate one or more actions 1467 using one or more models 1461 (e.g., a planning model, a scoring model, etc.). In some embodiments, the actions 1467 include one or more actionable insights. In certain embodiments, the actions are provided to one or more users 1470 (e.g., operational users). In certain examples, the device constellation system compiles one or more user AI requests into one or more optimized collection requests across many specialized sensors and/or uploads one or more tailored AI models to edge devices (e.g., satellites, aircrafts, vehicles, etc.). As an example, one or more AI insights are fused and returned to users for operational planning and/or execution via an operational engine 1465.

FIG. 15 is a simplified diagram showing a method 1500 for model and sensor orchestration (e.g., model orchestration and sensor correlation) according to certain embodiments of the present disclosure. This diagram is merely an example. One of ordinary skill in the art would recognize many variations, alternatives, and modifications. The method 1500 for model orchestration and sensor correlation includes processes 1510, 1515, 1520, 1525, 1530, 1535, 1540, 1545, 1550, 1555 and 1560. Although the above has been shown using a selected group of processes for the method 1500 for model orchestration and sensor correlation, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 1500 are performed by a system (e.g., the computing system 1600). In certain examples, some or all processes (e.g., steps) of the method 1500 are performed by a computer and/or a processor directed by a code. For example, a computer includes a server computer and/or a client computer (e.g., a personal computer). In some examples, some or all processes (e.g., steps) of the method 1500 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to certain embodiments, at process 1510, a system (e.g., a model orchestration and sensor correlation system) receives, accesses, and/or generates a plurality of models, where each model of the plurality of models is configured to process data. In some embodiments, at process 1515, the system receives information corresponding to a plurality of sensors associated with a plurality of edge devices (e.g., edge devices 1410). In certain embodiments, the system generates a first representation of the plurality of models (e.g., a list of models with features). In some embodiments, the system generates a second representation of the plurality of sensors (e.g., a list of sensors and/or edge devices, a list of sensors and/or edge devices with location information). In certain embodiments, the system renders the first representation at a first section of a user interface (e.g., a display). In some embodiments, the system renders the second representation at a second section of the user interface, the second section being different from the first section (e.g., left section, right section, etc.).

According to some embodiments, at process 1520, the system selects one or more models from the plurality of models based on a processing request. In certain embodiments, the processing request includes a request, one or more parameters (e.g., request parameters, sensor parameters, model parameters, device parameters, object parameters, etc.). In some embodiments, the system selects at least one of the one or more models based on an input (e.g., a software input, a user input, etc.). In certain embodiments, at process 1525, the system selects one or more sensors from the plurality of sensors based on the processing request. In some embodiments, the processing request can be related to an object, an area, a time, a time range, and/or the like.

According to certain embodiments, at process 1530, the system builds one or more model pipelines based at least in part on the one or more selected models and the one or more selected sensors. In some embodiments, each model pipeline of the one or more model pipelines including information associated with at least one selected model of the one or more selected models or at least one selected sensor of the one or more selected sensors. In certain embodiments, a first model pipeline of the one or more model pipelines includes a first model of the one or more selected models to be applied to data collected by a first sensor of the one or more selected sensors. In some embodiments, a second model pipeline of the one or more model pipelines includes a second model of the one or more selected models to be applied to data collected by a second sensor of the one or more selected sensors. In certain embodiments, the first model is different from the second model. In some embodiments, the first sensor is different from the second sensor.

According to some embodiments, at process 1535, the system deploys the one or more model pipelines, for example, to at least one of the plurality of edge devices. In some embodiments, the system compiles a configuration message associated with the one or more model pipelines. In certain embodiments, the configuration message includes information of one or more models (e.g., a perception model) with associated model parameters. In some embodiments, the configuration message includes information of one or more sensors (e.g., an image sensor) with associated sensor parameters. In certain embodiments, the configuration message includes updated model parameters and/or updated sensor parameters. In some embodiments, the configuration message includes a command to replacing a first model by a second model. In certain embodiments, the configuration message includes replacing a first sensor by a second sensor. In some embodiments, the system transmits the configuration message to at least one edge device of the one or more edge devices.

According to certain embodiments, at process 1540, the system receives a model output from the one or more model pipelines. In some embodiments, the model output includes an insight. In certain embodiments, the model output includes raw sensor data and/or processed sensor data. In some embodiments, the system generates an insight (e.g., an identification of a target object) based on the model output (e.g., raw sensor and/or processed sensor data). In certain embodiments, the system generates a third representation of the model output and/or the insight. In some embodiments, the system renders the plurality of models, the plurality of sensors, the model output, and/or the insight at a user interface. In certain embodiments, the system renders the plurality of models, the plurality of sensors, the model output, and/or the insight at different sections of a user interface. In certain embodiments, the system renders the first representation, the second representation, and/or the third representation at a user interface. In some embodiments, the system renders the first representation, the second representation, and/or the third representation at different sections (e.g., upper section, upper left section, middle section, left section, right section, etc.) a user interface. In certain examples, the system renders the model output via a video player.

According to some embodiments, at process 1550, the system receives a feedback. In certain embodiments, the feedback is associated with the model output/or the insight. For example, the feedback is to zoom-in an image sensor. As an example, the feedback is to change a field-of-view of an image sensor. In some embodiments, the feedback is to replace a sensor and/or change one or more sensor parameters. In certain embodiments, the feedback is to replace a model and/or change one or more model parameters. In some embodiments, the feedback is associated with a model output of a model pipeline. In certain examples, the system receives a first model output from a first model pipeline of the one or more model pipelines as a feedback to modifying the a model pipeline of the one or more model pipelines.

According to certain embodiments, at process 1555, the system modifies at least one model pipeline of the one or more model pipelines and/or generates a new model pipeline based on the feedback. In some embodiments, the at least one model pipeline includes a new and/or updated model. In certain embodiments, the at least one model pipeline includes an indication of a different sensor and/or sensor parameters. In some embodiments, the system builds a new model pipeline, for example, for a new edge device (e.g., a new edge device in proximity). In some embodiments, at process 1560, the system deploys the at least one modified model pipeline and/or the new model pipeline.

According to some embodiments, the system receives an indication of selected data, for example, via an input (e.g., a user input, a software input). In certain embodiments, the system trains a machine learning model of the plurality of models using the selected data (e.g., training data) to generate a trained machine learning model and builds at least one model pipeline of the one or more model pipelines using the trained machine learning model. In some embodiments, the system deploys the trained machine learning model with a corresponding model pipeline. In certain embodiments, the system receives a configuration associated with training data. In some embodiments, the system transforms the training data based at least in part on the configuration. In certain embodiments, the transformation includes filtering, modifying, normalizing, and/or applying a function.

Figure 16:
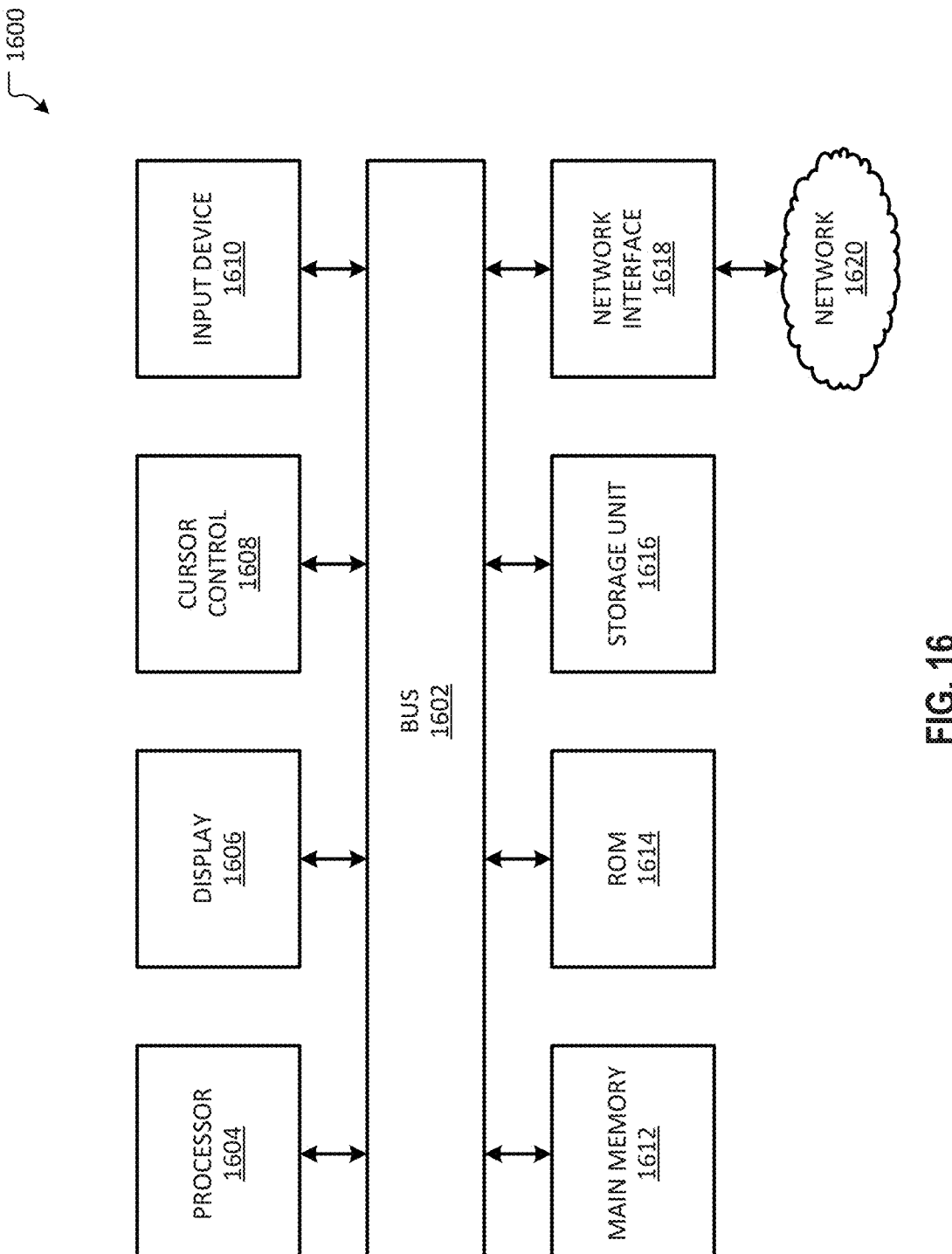
FIG. 16 is a simplified diagram showing a computing system for implementing a system for model orchestration and sensor correlation in accordance with at least one example set forth in the disclosure.

FIG. 16 is a simplified diagram showing a computing system for implementing a system 1600 for model orchestration and sensor correlation in accordance with at least one example set forth in the disclosure. This diagram is merely an example, which should not unduly limit the scope of the claims. One of ordinary skill in the art would recognize many variations, alternatives, and modifications.

The computing system 1600 includes a bus 1602 or other communication mechanism for communicating information, a processor 1604, a display 1606, a cursor control component 1608, an input device 1610, a main memory 1612, a read only memory (ROM) 1614, a storage unit 1616, and a network interface 1618. In some embodiments, some or all processes (e.g., steps) of the method 1500 are performed by the computing system 1600. In some examples, the bus 1602 is coupled to the processor 1604, the display 1606, the cursor control component 1608, the input device 1610, the main memory 1612, the read only memory (ROM) 1614, the storage unit 1616, and/or the network interface 1618. In certain examples, the network interface is coupled to a network 1620. For example, the processor 1604 includes one or more general purpose microprocessors. In some examples, the main memory 1612 (e.g., random access memory (RAM), cache and/or other dynamic storage devices) is configured to store information and instructions to be executed by the processor 1604. In certain examples, the main memory 1612 is configured to store temporary variables or other intermediate information during execution of instructions to be executed by processor 1604. For examples, the instructions, when stored in the storage unit 1616 accessible to processor 1604, render the computing system 1600 into a special-purpose machine that is customized to perform the operations specified in the instructions. In some examples, the ROM 1614 is configured to store static information and instructions for the processor 1604. In certain examples, the storage unit 1616 (e.g., a magnetic disk, optical disk, or flash drive) is configured to store information and instructions.

In some embodiments, the display 1606 (e.g., a cathode ray tube (CRT), an LCD display, or a touch screen) is configured to display information to a user of the computing system 1600. In some examples, the input device 1610 (e.g., alphanumeric and other keys) is configured to communicate information and commands to the processor 1604. For example, the cursor control component 1608 (e.g., a mouse, a trackball, or cursor direction keys) is configured to communicate additional information and commands (e.g., to control cursor movements on the display 1606) to the processor 1604.

According to certain embodiments, a method for model and sensor orchestration, the method comprising: accessing a plurality of models, each model of the plurality of models configured to process data; receiving information corresponding to a plurality of sensors associated with a plurality of edge devices; selecting one or more models from the plurality of models based on a processing request; selecting one or more sensors from the plurality of sensors based on the processing request; building one or more model pipelines based at least in part on the one or more selected models and the one or more selected sensors, each model pipeline of the one or more model pipelines including information associated with at least one selected model of the one or more selected models or at least one selected sensor of the one or more selected sensors; and deploying the one or more model pipelines; wherein the method is performed using one or more processors, wherein the method is performed using one or more processors. For example, the method is implemented according to at least FIG. 1, FIG. 2, FIG. 3 and/or FIG. 15.

In some embodiments, the method further comprises: receiving an indication of selected data; and training a machine learning model of the plurality of models using the selected data to generate a trained machine learning model; wherein the building the one or more model pipelines comprises building at least one model pipeline using the trained machine learning model; wherein the deploying the one or more model pipelines comprises deploying the trained machine learning model. In certain embodiments, the method further comprises: receiving a configuration associated with the selected data; and transforming the selected data based at least in part on the configuration. In some embodiments, the method further comprises: generating a first representation of the plurality of models; generating a second representation of the plurality of sensors; rendering the first representation at a first section of a user interface; and rendering the second representation at a second section of the user interface, the second section being different from the first section.

In certain embodiments, the method further comprises: receiving a model output from at least one model pipeline of the one or more model pipelines; generating a third representation of the model output; and rendering the third representation at a third section of the user interface. In some embodiments, the method further comprises: receiving a feedback associated with the model output; modifying at least one model pipeline of the one or more model pipelines based on the feedback; and deploying the at least one modified model pipeline. In certain embodiments, the rendering the third representation comprises rendering the third representation via a video player. In some embodiments, the method further comprises: generating an insight based at least in part on the model output; wherein the generating a third representation comprises generating the third representation based at least in part on the insight; receiving a feedback associated with the insight; modifying at least one model pipeline of the one or more model pipelines based on the feedback; and deploying the at least one modified model pipeline.

In some embodiments, the deploying the one or more model pipelines comprises: compiling a configuration message associated with the one or more model pipelines; and transmitting the configuration message to at least one edge device of the one or more edge devices. In certain embodiments, a first model pipeline of the one or more model pipelines includes a first model of the one or more selected models to be applied to data collected by a first sensor of the one or more selected sensors, wherein a second model pipeline of the one or more model pipelines includes a second model of the one or more selected models to be applied to data collected by a second sensor of the one or more selected sensors, wherein the first model is different from the second model, wherein the first sensor is different from the second sensor, wherein the method further comprises: receiving a first model output from the first model pipeline; modifying the second model pipeline based at least in part on the first model output.

According to certain embodiments, a system for model and sensor orchestration, the system comprising: one or more memories comprising instructions stored thereon; and one or more processors configured to execute the instructions and perform operations comprising: accessing a plurality of models, each model of the plurality of models configured to process data; receiving information corresponding to a plurality of sensors associated with a plurality of edge devices; selecting one or more models from the plurality of models based on a processing request; selecting one or more sensors from the plurality of sensors based on the processing request; building one or more model pipelines based at least in part on the one or more selected models and the one or more selected sensors, each model pipeline of the one or more model pipelines including information associated with at least one selected model of the one or more selected models or at least one selected sensor of the one or more selected sensors; and deploying the one or more model pipelines to at least one of the plurality of edge devices. For example, the method is implemented according to at least FIG. 1, FIG. 2, FIG. 3 and/or FIG. 15.

In some embodiments, the operations further comprise: receiving an indication of selected data; and training a machine learning model of the plurality of models using the selected data to generate a trained machine learning model; wherein the building the one or more model pipelines comprises building at least one model pipeline using the trained machine learning model; wherein the deploying the one or more model pipelines comprises deploying the trained machine learning model. In certain embodiments, the operations further comprise: receiving a configuration associated with the selected data; and transforming the selected data based at least in part on the configuration. In some embodiments, the operations further comprise: generating a first representation of the plurality of models; generating a second representation of the plurality of sensors; rendering the first representation at a first section of a user interface; and rendering the second representation at a second section of the user interface, the second section being different from the first section.

In certain embodiments, the operations further comprise: receiving a model output from at least one model pipeline of the one or more model pipelines; generating a third representation of the model output; and rendering the third representation at a third section of the user interface. In some embodiments, the operations further comprise: receiving a feedback associated with the model output; modifying at least one model pipeline of the one or more model pipelines based on the feedback; and deploying the at least one modified model pipeline. In certain embodiments, the rendering the third representation comprises rendering the third representation via a video player. In some embodiments, the operations further comprise: generating an insight based at least in part on the model output; wherein the generating a third representation comprises generating the third representation based at least in part on the insight; receiving a feedback associated with the insight; modifying at least one model pipeline of the one or more model pipelines based on the feedback; and deploying the at least one modified model pipeline.

In some embodiments, the deploying the one or more model pipelines comprises: compiling a configuration message associated with the one or more model pipelines; and transmitting the configuration message to at least one edge device of the one or more edge devices. In certain embodiments, a first model pipeline of the one or more model pipelines includes a first model of the one or more selected models to be applied to data collected by a first sensor of the one or more selected sensors, wherein a second model pipeline of the one or more model pipelines includes a second model of the one or more selected models to be applied to data collected by a second sensor of the one or more selected sensors, wherein the first model is different from the second model, wherein the first sensor is different from the second sensor, wherein the operations further comprise: receiving a first model output from the first model pipeline; modifying the second model pipeline based at least in part on the first model output.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments.

What is claimed is:

1. A method for model and sensor orchestration, the method comprising:

accessing a plurality of models, each model of the plurality of models configured to process data;

receiving information corresponding to a plurality of sensors associated with a plurality of edge devices;

selecting one or more models from the plurality of models based on a processing request;

selecting one or more sensors from the plurality of sensors based on the processing request;

building one or more model pipelines based on both the one or more selected models and the one or more selected sensors, each model pipeline of the one or more model pipelines including information associated with at least one selected model of the one or more selected models or at least one selected sensor of the one or more selected sensors; and deploying the one or more model pipelines;

wherein the method is performed using one or more processors.

2. The method of claim 1, further comprising:

receiving an indication of selected data; and training a machine learning model of the plurality of models using the selected data to generate a trained machine learning model;

wherein the building the one or more model pipelines comprises building at least one model pipeline using the trained machine learning model;

wherein the deploying the one or more model pipelines comprises deploying the trained machine learning model.

3. The method of claim 2, further comprising:

receiving a configuration associated with the selected data; and transforming the selected data based at least in part on the configuration.

4. The method of claim 1, further comprising:

generating a first representation of the plurality of models;

generating a second representation of the plurality of sensors;

rendering the first representation at a first section of a user interface; and rendering the second representation at a second section of the user interface, the second section being different from the first section.

5. The method of claim 4, further comprising:

receiving a model output from at least one model pipeline of the one or more model pipelines;

generating a third representation of the model output; and rendering the third representation at a third section of the user interface.

6. The method of claim 5, further comprising:

receiving a feedback associated with the model output;

modifying at least one model pipeline of the one or more model pipelines based on the feedback; and deploying the at least one modified model pipeline.

7. The method of claim 5, wherein the rendering the third representation comprises rendering the third representation via a video player.

8. The method of claim 5, further comprising:

generating an insight based at least in part on the model output;

wherein the generating a third representation comprises generating the third representation based at least in part on the insight;

receiving a feedback associated with the insight;

modifying at least one model pipeline of the one or more model pipelines based on the feedback; and deploying the at least one modified model pipeline.

9. The method of claim 1, wherein the deploying the one or more model pipelines comprises:

compiling a configuration message associated with the one or more model pipelines; and transmitting the configuration message to at least one edge device of the plurality of edge devices.

10. The method of claim 1, wherein a first model pipeline of the one or more model pipelines includes a first model of the one or more selected models to be applied to data collected by a first sensor of the one or more selected sensors, wherein a second model pipeline of the one or more model pipelines includes a second model of the one or more selected models to be applied to data collected by a second sensor of the one or more selected sensors, wherein the first model is different from the second model, wherein the first sensor is different from the second sensor, wherein the method further comprises:

receiving a first model output from the first model pipeline;

modifying the second model pipeline based at least in part on the first model output.

11. A system for model and sensor orchestration, the system comprising:

one or more memories comprising instructions stored thereon; and one or more processors configured to execute the instructions and perform operations comprising:

accessing a plurality of models, each model of the plurality of models configured to process data;

receiving information corresponding to a plurality of sensors associated with a plurality of edge devices;

selecting one or more models from the plurality of models based on a processing request;

selecting one or more sensors from the plurality of sensors based on the processing request;

building one or more model pipelines based on both the one or more selected models and the one or more selected sensors, each model pipeline of the one or more model pipelines including information associated with at least one selected model of the one or more selected models or at least one selected sensor of the one or more selected sensors; and deploying the one or more model pipelines.

12. The system of claim 11, wherein the operations further comprise:

receiving an indication of selected data; and training a machine learning model of the plurality of models using the selected data to generate a trained machine learning model;

wherein the building the one or more model pipelines comprises building at least one model pipeline using the trained machine learning model;

wherein the deploying the one or more model pipelines comprises deploying the trained machine learning model.

13. The system of claim 12, wherein the operations further comprise:

receiving a configuration associated with the selected data; and transforming the selected data based at least in part on the configuration.

14. The system of claim 11, wherein the operations further comprise:

generating a first representation of the plurality of models;

generating a second representation of the plurality of sensors;

rendering the first representation at a first section of a user interface; and rendering the second representation at a second section of the user interface, the second section being different from the first section.

15. The system of claim 14, wherein the operations further comprise:

receiving a model output from at least one model pipeline of the one or more model pipelines;

generating a third representation of the model output; and rendering the third representation at a third section of the user interface.

16. The system of claim 15, wherein the operations further comprise:

receiving a feedback associated with the model output;

modifying at least one model pipeline of the one or more model pipelines based on the feedback; and deploying the at least one modified model pipeline.

17. The system of claim 15, wherein the rendering the third representation comprises rendering the third representation via a video player.

18. The system of claim 15, wherein the operations further comprise:

generating an insight based at least in part on the model output;

wherein the generating a third representation comprises generating the third representation based at least in part on the insight;

receiving a feedback associated with the insight;

modifying at least one model pipeline of the one or more model pipelines based on the feedback; and deploying the at least one modified model pipeline.

19. The system of claim 11, wherein the deploying the one or more model pipelines comprises:

compiling a configuration message associated with the one or more model pipelines; and transmitting the configuration message to at least one edge device of the plurality of edge devices.

20. The system of claim 11, wherein a first model pipeline of the one or more model pipelines includes a first model of the one or more selected models to be applied to data collected by a first sensor of the one or more selected sensors, wherein a second model pipeline of the one or more model pipelines includes a second model of the one or more selected models to be applied to data collected by a second sensor of the one or more selected sensors, wherein the first model is different from the second model, wherein the first sensor is different from the second sensor, wherein the operations further comprise:

receiving a first model output from the first model pipeline;

modifying the second model pipeline based at least in part on the first model output.

21. A method for model and sensor orchestration, the method comprising:

accessing a plurality of models, each model of the plurality of models configured to process data;

receiving information corresponding to a plurality of sensors associated with a plurality of edge devices;

selecting one or more models from the plurality of models based on a processing request;

selecting one or more sensors from the plurality of sensors based on the processing request;

building one or more model pipelines based at least in part on the one or more selected models and the one or more selected sensors, each model pipeline of the one or more model pipelines including information associated with at least one selected model of the one or more selected models or at least one selected sensor of the one or more selected sensors;

deploying the one or more model pipelines;

receiving a model output from at least one model pipeline of the one or more model pipelines;

receiving a feedback associated with the model output;

modifying at least one model pipeline of the one or more model pipelines based on the feedback; and deploying the at least one modified model pipeline;

wherein the method is performed using one or more processors.

22. A system for model and sensor orchestration, the system comprising:

one or more memories comprising instructions stored thereon; and one or more processors configured to execute the instructions and perform operations comprising:

accessing a plurality of models, each model of the plurality of models configured to process data;

receiving information corresponding to a plurality of sensors associated with a plurality of edge devices;

selecting one or more models from the plurality of models based on a processing request;

selecting one or more sensors from the plurality of sensors based on the processing request;

building one or more model pipelines based at least in part on the one or more selected models and the one or more selected sensors, each model pipeline of the one or more model pipelines including information associated with at least one selected model of the one or more selected models or at least one selected sensor of the one or more selected sensors;

deploying the one or more model pipelines;

receiving a model output from at least one model pipeline of the one or more model pipelines;

receiving a feedback associated with the model output;

modifying at least one model pipeline of the one or more model pipelines based on the feedback; and deploying the at least one modified model pipeline.

* * * * *